US012625474B2

(12) United States Patent
Endel et al.

(10) Patent No.: US 12,625,474 B2
(45) Date of Patent: May 12, 2026

(54) AUTOMATED ASSET STRATEGY SELECTION FOR AN ASSET VIA CLOUD-BASED SUPERVISORY CONTROL

(71) Applicant: Honeywell International Inc., Charlotte, NC (US)

(72) Inventors: Petr Endel, Prague (CZ); Michal Vrana, Studnice (CZ); Karel Marik, Řevnice (CZ); Raman Samusevich, Prague (CZ); Vaclav Slimacek, Valasske Mezirici (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 505 days.

(21) Appl. No.: 17/822,003

(22) Filed: Aug. 24, 2022

(65) Prior Publication Data

US 2023/0062849 A1     Mar. 2, 2023

Related U.S. Application Data

(62) Division of application No. 17/893,932, filed on Aug. 23, 2022, now Pat. No. 12,474,677.

(Continued)

(51) Int. Cl.
*G05B 13/02* (2006.01)
*G05B 19/042* (2006.01)
(Continued)

(52) U.S. Cl.
CPC ......... *G05B 13/021* (2013.01); *G05B 19/042* (2013.01); *G05B 19/4183* (2013.01); *G05D 23/1917* (2013.01); *G05B 2219/2614* (2013.01)

(58) Field of Classification Search
CPC .......................... G05B 13/021; G05B 19/042; G05B 19/4183; G05B 2219/2614; G05D 23/1917
See application file for complete search history.

(56) References Cited

U.S. PATENT DOCUMENTS

2010/0286937 A1    11/2010    Hedley et al.
2015/0094968 A1     4/2015    Jia et al.
(Continued)

FOREIGN PATENT DOCUMENTS

WO    2018/112352 A1    6/2018
WO    2022/038906 A1    2/2022

OTHER PUBLICATIONS

ISA/220—Notification of Transmittal or Search Report and Written Opinion of the ISA, or the Declaration Mailed on Apr. 19, 2023 for WO Application No. PCT/US22/041387, 20 page(s).
(Continued)

*Primary Examiner* — Michael W Choi
(74) *Attorney, Agent, or Firm* — Alston & Bird LLP

(57) ABSTRACT

Various embodiments described herein relate to automated asset strategy selection for assets via cloud-based supervisory control. In this regard, one or more baselines for asset strategy data related to an asset is estimated based on a regression analysis process associated with the asset. Additionally, a maximum uncertainty level for the one or more baselines is determined, one or more conditions related to energy optimization for an environment associated with the asset is estimated for a future period of time, and a predicted uncertainty level for the one or more conditions related to the energy optimization is determined. Based on a comparison between the maximum uncertainty level and the predicted uncertainty level, a predetermined asset strategy or an energy optimization asset strategy for the future period of time is then selected.

15 Claims, 23 Drawing Sheets

Related U.S. Application Data

(60) Provisional application No. 63/236,271, filed on Aug. 24, 2021.

(51) Int. Cl.
| | | |
|---|---|---|
| *G05B 19/418* | (2006.01) | |
| *G05D 23/19* | (2006.01) | |

(56) References Cited

U.S. PATENT DOCUMENTS

| | | | |
|---|---|---|---|
| 2016/0305678 A1 | 10/2016 | Pavlovski et al. | |
| 2017/0314800 A1* | 11/2017 | Bengea | F24F 11/62 |
| 2019/0011146 A1 | 1/2019 | Seo et al. | |
| 2019/0158309 A1 | 5/2019 | Park et al. | |
| 2020/0006946 A1* | 1/2020 | Fife | H02J 3/008 |
| 2020/0141608 A1 | 5/2020 | Sinha et al. | |
| 2020/0356087 A1* | 11/2020 | Elbsat | G05B 23/0254 |
| 2021/0173366 A1 | 6/2021 | Turney et al. | |
| 2021/0199328 A1 | 7/2021 | Venkatesh et al. | |
| 2021/0310685 A1 | 10/2021 | Kanematsu et al. | |
| 2021/0325072 A1* | 10/2021 | Lin | F24F 11/47 |

OTHER PUBLICATIONS

IPEA/409—International Preliminary Report on Patentability Mailed on Mar. 7, 2024 for WO Application No. PCT/US22/041387, 13 page(s).

Examiner Interview Summary Record (PTOL-413) Mailed on Nov. 13, 2024 for U.S. Appl. No. 17/893,932, 2 page(s).

Non-Final Rejection Mailed on Nov. 7, 2024 for U.S. Appl. No. 17/893,932, 13 page(s).

Examiner Interview Summary Record (PTOL-413) Mailed on Jul. 9, 2025 for U.S. Appl. No. 17/893,932, 1 page(s).

Notice of Allowance and Fees Due (PTOL-85) Mailed on Jul. 9, 2025 for U.S. Appl. No. 17/893,932, 14 page (s).

* cited by examiner

600

1700

ZONES & PLANTS | ALERTS (47)

SHOW FOR PAST

○ CUSTOM ○30M ○HOUR ○2 HOURS ●12 HOURS ○24 HOURS ○3 DAYS ○7 DAYS [REFRESH]

⊘ ALL SERVICES RUNNING

HU_FCU_3RDFLOOR_2780 [x][🔍]  ENERGY OPTIMIZATION IS CURRENTLY STARTED [STOP]   [EXPORT]

ZONES  PLANT

| ZONE | | ISSUE ACTIVITY ◇ | LIMITS | STATUS ◇ | OCCUPIED ◇ | ROGUE DET... ◇ | TEMP TARGET SUGGESTED | ACTIONS |
|---|---|---|---|---|---|---|---|---|
| DDC_P01-23-FCU_01-23 | ZG_ChSys1-HEAD | 56.9% | TEMP: HIGH: 28.2 | ENABLED | YES | YES | HIGH: 27.9 LOW: | ⌂ |
| DDC_P01-32-FCU_01-32 | ZG_ChSys1-HEAD | 54.7% | TEMP: HIGH: 29 | ENABLED | YES | NO | HIGH: LOW: | ⌂ |
| DDC_P01-02-AHU_01-02 | ZG_ChSys1-HEAD | 48.3% | AUTOMATIC TEMP-HIGH: 25.5 | ENABLED | YES | YES | HIGH: 29.9 LOW: | ⌂ |
| DDC_P02-32-FCU_02-32 | ZG_ChSys1-HEAD | 34.0% | TEMP: HIGH: 29 | ENABLED | YES | NO | HIGH: LOW: | ⌂ |
| DDC_COR-3-AHU_COR-2B | ZG_ChSys1-HEAD | 33.6% | AUTOMATIC TEMP: HIGH: 25.5 | ENABLED | YES | NO | HIGH: LOW: | ⌂ |
| DDC_P01-03-FCU_01-03 | ZG_ChSys1-HEAD | 32.8% | TEMP: HIGH: 25 | ENABLED | YES | NO | HIGH: LOW: | ⌂ |
| DDC_P03-PLL-FCU_03-PLL | ZG_ChSys1-HEAD | 10.1% | AUTOMATIC TEMP: HIGH: 25 | ENABLED | YES | NO | HIGH: 25.3 LOW: | ⌂ |

[BULK EDIT]

( ? ) PERCENTILE MODEL COOLING DEMAND THRESHOLD

98

( ? ) PERCENTILE MODEL HEATING DEMAND THRESHOLD

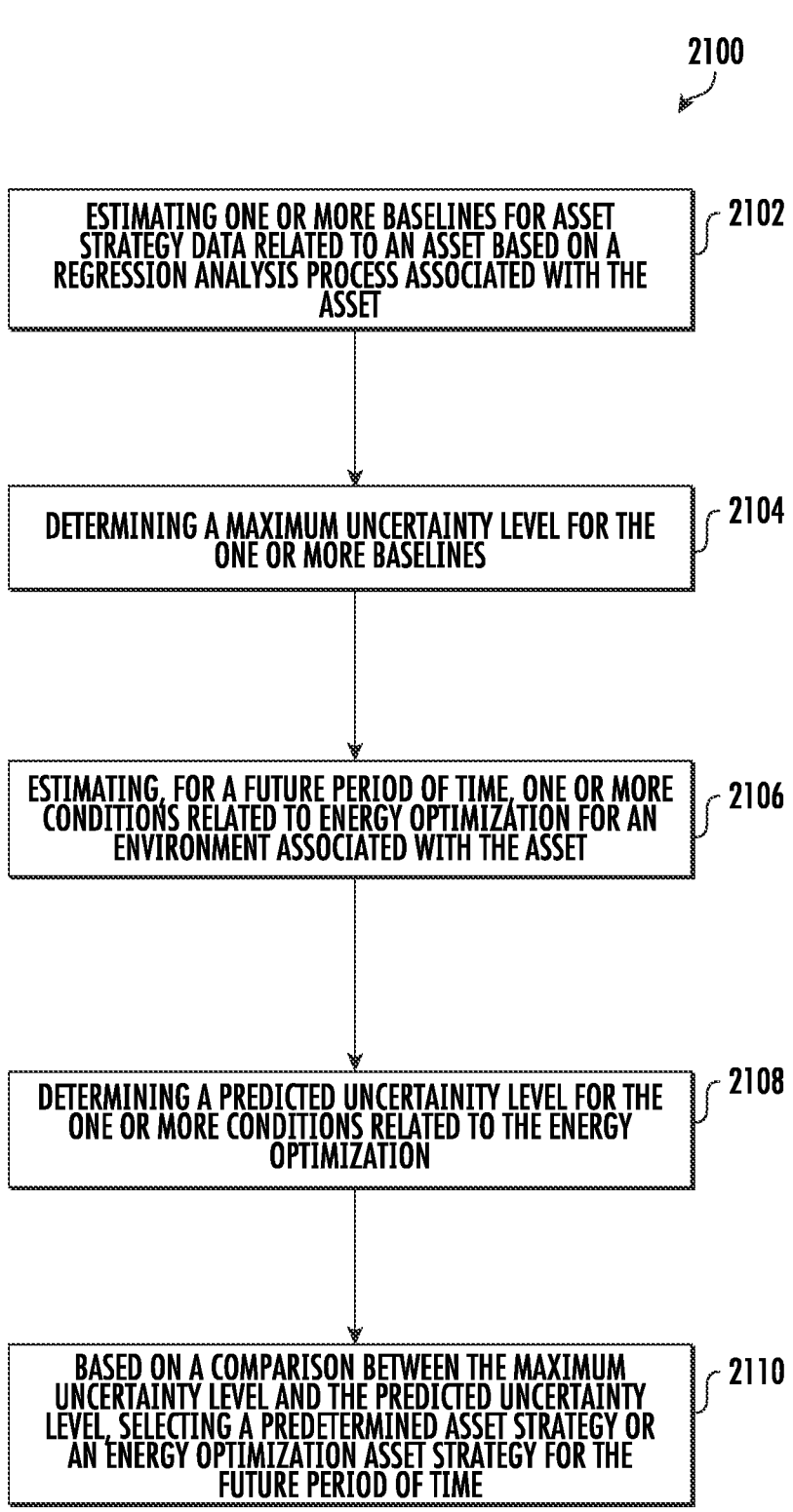

ESTIMATING ONE OR MORE BASELINES FOR ASSET STRATEGY DATA RELATED TO AN ASSET BASED ON A REGRESSION ANALYSIS PROCESS ASSOCIATED WITH THE ASSET    — 2102

DETERMINING A MAXIMUM UNCERTAINTY LEVEL FOR THE ONE OR MORE BASELINES    — 2104

ESTIMATING, FOR A FUTURE PERIOD OF TIME, ONE OR MORE CONDITIONS RELATED TO ENERGY OPTIMIZATION FOR AN ENVIRONMENT ASSOCIATED WITH THE ASSET    — 2106

DETERMINING A PREDICTED UNCERTAINTY LEVEL FOR THE ONE OR MORE CONDITIONS RELATED TO THE ENERGY OPTIMIZATION    — 2108

BASED ON A COMPARISON BETWEEN THE MAXIMUM UNCERTAINTY LEVEL AND THE PREDICTED UNCERTAINTY LEVEL, SELECTING A PREDETERMINED ASSET STRATEGY OR AN ENERGY OPTIMIZATION ASSET STRATEGY FOR THE FUTURE PERIOD OF TIME    — 2110

2202
RECEIVING A REQUEST TO PERFORM SUPERVISORY CONTROL WITH RESPECT TO AN ASSET

2204
IN RESPONSE TO THE REQUEST, PERFORMING THE SUPERVISORY CONTROL WITH RESPECT TO THE ASSET

2206
IN RESPONSE TO AN OUTAGE CONDITION ASSOCIATED WITH THE ASSET DURING THE SUPERVISORY CONTROL, DETERMINING WHETHER TO PERFORM AN OPTIMIZATION SCHEME FOR AN ASSET STRATEGY RELATED TO THE ASSET

AUTOMATED ASSET STRATEGY SELECTION FOR AN ASSET VIA CLOUD-BASED SUPERVISORY CONTROL

CROSS REFERENCE TO RELATED APPLICATIONS

This application is a divisional of and claims priority to U.S. application Ser. No. 17/893,932, titled "AUTOMATED SETPOINT GENERATION FOR AN ASSET VIA CLOUD-BASED SUPERVISORY CONTROL," and filed Aug. 23, 2022, which claims the benefit of U.S. Provisional Patent Application No. 63/236,271, titled "AUTOMATED SET-POINT GENERATION FOR AN ASSET VIA CLOUD-BASED SUPERVISORY CONTROL," and filed on Aug. 24, 2021, the contents of which are hereby incorporated by reference in their entirety.

TECHNICAL FIELD

The present disclosure relates generally to performance management related to assets, and more particularly to automated setpoint generation for assets via cloud-based supervisory control.

BACKGROUND

Asset settings for an asset are generally configured by a user based on user knowledge or written instructions. For example, settings for a heating, ventilation and air conditioning (HVAC) system are generally configured by a user based on user knowledge or written instructions with respect to the HVAC system. However, asset settings configured based on user knowledge or written instructions with respect to an asset generally results in inefficiencies and/or decreased performance for the asset.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive a request to perform supervisory control with respect to an asset. In one or more embodiments, the request comprises an asset identifier indicating an identity of the asset. In response to the request, the one or more programs comprise instructions configured to determine one or more setpoints for the asset based on the asset identifier. In response to the request, the one or more programs also comprise instructions configured to determine, based on the asset identifier, comfort constraint data indicative of one or more comfort constraints for an environment associated with the asset. Additionally, in response to the request, the one or more programs comprise instructions configured to adjust the one or more setpoints for the asset based on the comfort constraint data.

In another embodiment, a method comprises, at a device with one or more processors and a memory, receiving a request to perform supervisory control with respect to an asset. In one or more embodiments, the request comprises an asset identifier indicating an identity of the asset. In response to the request, the method comprises determining one or more setpoints for the asset based on the asset identifier. In response to the request, the method also comprises determining, based on the asset identifier, comfort constraint data indicative of one or more comfort constraints for an environment associated with the asset. Additionally, in response to the request, the method comprises adjusting the one or more setpoints for the asset based on the comfort constraint data.

In yet another embodiment, a non-transitory computer-readable storage medium comprises one or more programs for execution by one or more processors of a device. The one or more programs comprise instructions which, when executed by the one or more processors, cause the device to receive a request to perform supervisory control with respect to an asset. In one or more embodiments, the request comprises an asset identifier indicating an identity of the asset. The one or more programs comprise instructions which, when executed by the one or more processors and in response to the request, cause the device to determine one or more setpoints for the asset based on the asset identifier. The one or more programs also comprise instructions which, when executed by the one or more processors and in response to the request, cause the device to determine, based on the asset identifier, comfort constraint data indicative of one or more comfort constraints for an environment associated with the asset. Additionally, one or more programs comprise instructions which, when executed by the one or more processors and in response to the request, cause the device to adjust the one or more setpoints for the asset based on the comfort constraint data.

In another embodiment, a system comprises one or more processors, a memory, and one or more programs stored in the memory. The one or more programs comprise instructions configured to estimate one or more baselines for asset strategy data related to an asset based on a regression analysis process associated with the asset. The one or more programs also comprise instructions configured to determine a maximum uncertainty level for the one or more baselines. The one or more programs also comprise instructions configured to estimate, for a future period of time, one or more conditions related to energy optimization for an environment associated with the asset. The one or more programs also comprise instructions configured to determine a predicted uncertainty level for the one or more conditions related to the energy optimization. Additionally, the one or more programs comprise instructions configured to, based on a comparison between the maximum uncertainty level and the predicted uncertainty level, select a predetermined asset strategy or an energy optimization asset strategy for the future period of time.

In another embodiment, a method comprises, at a device with one or more processors and a memory, estimating one or more baselines for asset strategy data related to an asset based on a regression analysis process associated with the asset. The method also comprises determining a maximum uncertainty level for the one or more baselines. The method also comprises estimating, for a future period of time, one or more conditions related to energy optimization for an environment associated with the asset. The method also comprises determining a predicted uncertainty level for the one or more conditions related to the energy optimization. Additionally, the method comprises, based on a comparison between the maximum uncertainty level and the predicted uncertainty level, selecting a predetermined asset strategy or an energy optimization asset strategy for the future period of time.

In yet another embodiment, a non-transitory computer-readable storage medium comprises one or more programs for execution by one or more processors of a device. The one or more programs comprise instructions which, when executed by the one or more processors, cause the device to estimate one or more baselines for asset strategy data related to an asset based on a regression analysis process associated with the asset. The one or more programs comprise instructions which, when executed by the one or more processors, also cause the device to determine a maximum uncertainty level for the one or more baselines. The one or more programs comprise instructions which, when executed by the one or more processors, also cause the device to estimate, for a future period of time, one or more conditions related to energy optimization for an environment associated with the asset. The one or more programs comprise instructions which, when executed by the one or more processors, also cause the device to determine a predicted uncertainty level for the one or more conditions related to the energy optimization. Additionally, the one or more programs comprise instructions which, when executed by the one or more processors, cause the device to, based on a comparison between the maximum uncertainty level and the predicted uncertainty level, select a predetermined asset strategy or an energy optimization asset strategy for the future period of time.

In another embodiment, a system comprises one or more processors, a memory, and one or more programs stored in the memory. The one or more programs comprise instructions configured to receive a request to perform supervisory control with respect to an asset. The one or more programs also comprise instructions configured to, in response to the request, perform the supervisory control with respect to the asset. The one or more programs also comprise instructions configured to, in response to an outage condition associated with the asset during the supervisory control, determine whether to perform an optimization scheme for an asset strategy related to the asset.

In another embodiment, a method comprises, at a device with one or more processors and a memory, receiving a request to perform supervisory control with respect to an asset. The method also comprises, in response to the request, performing the supervisory control with respect to the asset. The method also comprises, in response to an outage condition associated with the asset during the supervisory control, determining whether to perform an optimization scheme for an asset strategy related to the asset.

In yet another embodiment, a non-transitory computer-readable storage medium comprises one or more programs for execution by one or more processors of a device. The one or more programs comprise instructions which, when executed by the one or more processors, cause the device to receive a request to perform supervisory control with respect to an asset. The one or more programs comprise instructions which, when executed by the one or more processors, also cause the device to, in response to the request, perform the supervisory control with respect to the asset. The one or more programs comprise instructions which, when executed by the one or more processors, also cause the device to, in response to an outage condition associated with the asset during the supervisory control, determine whether to perform an optimization scheme for an asset strategy related to the asset.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 17 illustrates another exemplary user interface, in accordance with one or more embodiments described herein;

FIG. 19 illustrates another exemplary user interface, in accordance with one or more embodiments described herein;

FIG. 21 illustrates a flow diagram for providing automatic improvement of baselines for asset strategies, in accordance with one or more embodiments described herein;

DETAILED DESCRIPTION

Figure 1:
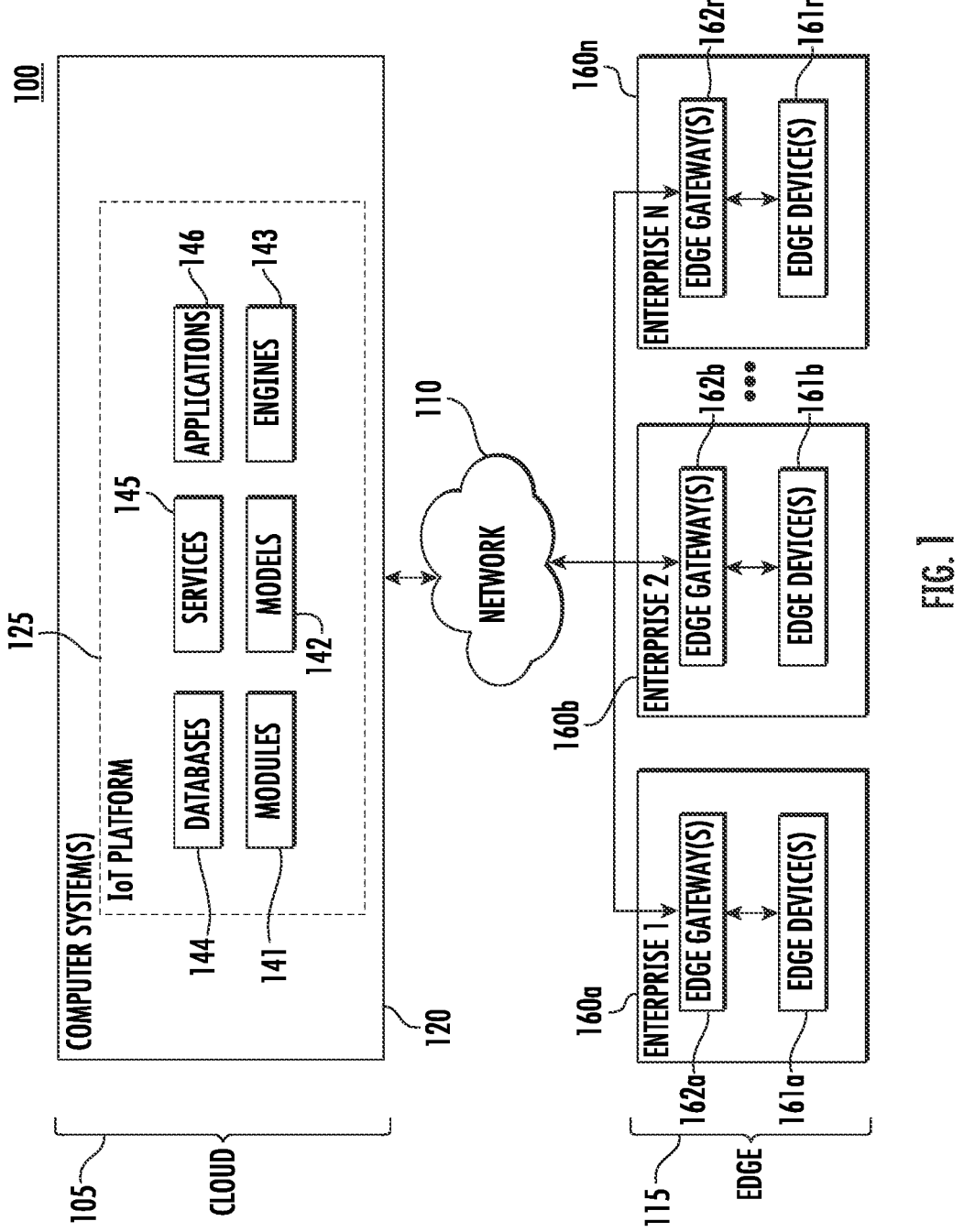
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Asset settings for an asset are generally configured by a user based on user knowledge or written instructions. For example, settings for a heating, ventilation and air conditioning (HVAC) system are generally configured by a user based on user knowledge or written instructions with respect to the HVAC system. However, asset settings configured based on user knowledge or written instructions with respect to an asset generally results in inefficiencies and/or decreased performance for the asset.

As an example, certain types of assets and/or asset environments (e.g., building zones) are associated with suboptimal performance and/or suboptimal energy efficiency due to suboptimal sensor locations, energy losses (e.g., due to open doors, high load, etc.), or other reasons. Often times, assets and/or asset environments associated with suboptimal performance and/or suboptimal energy efficiency have continuous 100% demand, regardless of energy provided from upstream equipment. Furthermore, such assets and/or asset environments often trigger full cooling/heating that further reduces performance and/or energy efficiency. Settings (e.g., temperature settings, etc.) for such assets and/or asset environments are generally determined via a manual process associated with data analysis. Moreover, equilibrium temperature for such assets and/or asset environments also generally drifts during an interval of time (e.g., due to seasonal changes of weather, etc.). As such, continuous or near-continuous data analysis with respect to settings for such assets and/or asset environments is generally advantageous in order to achieve optimal performance and/or optimal energy efficiency.

Thus, to address these and/or other issues, automated setpoint generation for one or more assets via cloud-based supervisory control is provided. In various embodiments, an energy optimization system provides a cloud-based closed loop control application that automatically adjusts one or more setpoints for an asset in order to minimize energy cost related to the asset while also maintaining comfort for an environment (e.g., a building zone, etc.) associated with the asset. In various embodiments, comfort constraints are represented by cooling demands and/or heating demands from one or more downstream environments with respect to the environment associated with the asset. For example, in certain embodiments, demand corresponds to output of a zone temperature controller configured to manipulate a cooling/heating value, a fan-coil unit, a damper position of a variable air volume box, or another portion of a heating/cooling asset. In various embodiments, an automated process for setting equilibrium temperatures and/or defining comfort constraints is provided. In various embodiments, a decision tree related to an automated recovery mechanism for cloud-based supervisory control of an asset is provided. In various embodiments, the cloud-based supervisory control provides continuous improvement of a baseline employed for savings evaluation associated with energy optimization for an asset. Moreover, according to one or more embodiments, one or more setpoints for an asset is fine-tuned based on comfort constraints for an environment associated with the asset.

As such, by employing one or more techniques disclosed herein, asset performance and/or asset efficiency is optimized. In various embodiments, an amount of time and/or an amount of processing related to monitoring of an asset is reduced. Furthermore, in various embodiments, performance and/or efficiency of an asset is improved while also providing an optimal level of comfort for an environment associated with the asset. Moreover, by employing one or more techniques disclosed herein, improved supervisory control of an asset is provided to a user via improved visual indicators associated with a graphical user interface. For instance, by employing one or more techniques disclosed herein, additional and/or improved supervisory control for an asset as compared to capabilities of conventional techniques is achieved. Additionally, performance of a processing system associated with data analytics is improved by employing one or more techniques disclosed herein. For example, a number of computing resources, a number of a storage requirements, and/or number of errors associated with supervisory control for an asset (e.g., for adjusting setpoints for an asset, etc.) is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprises any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
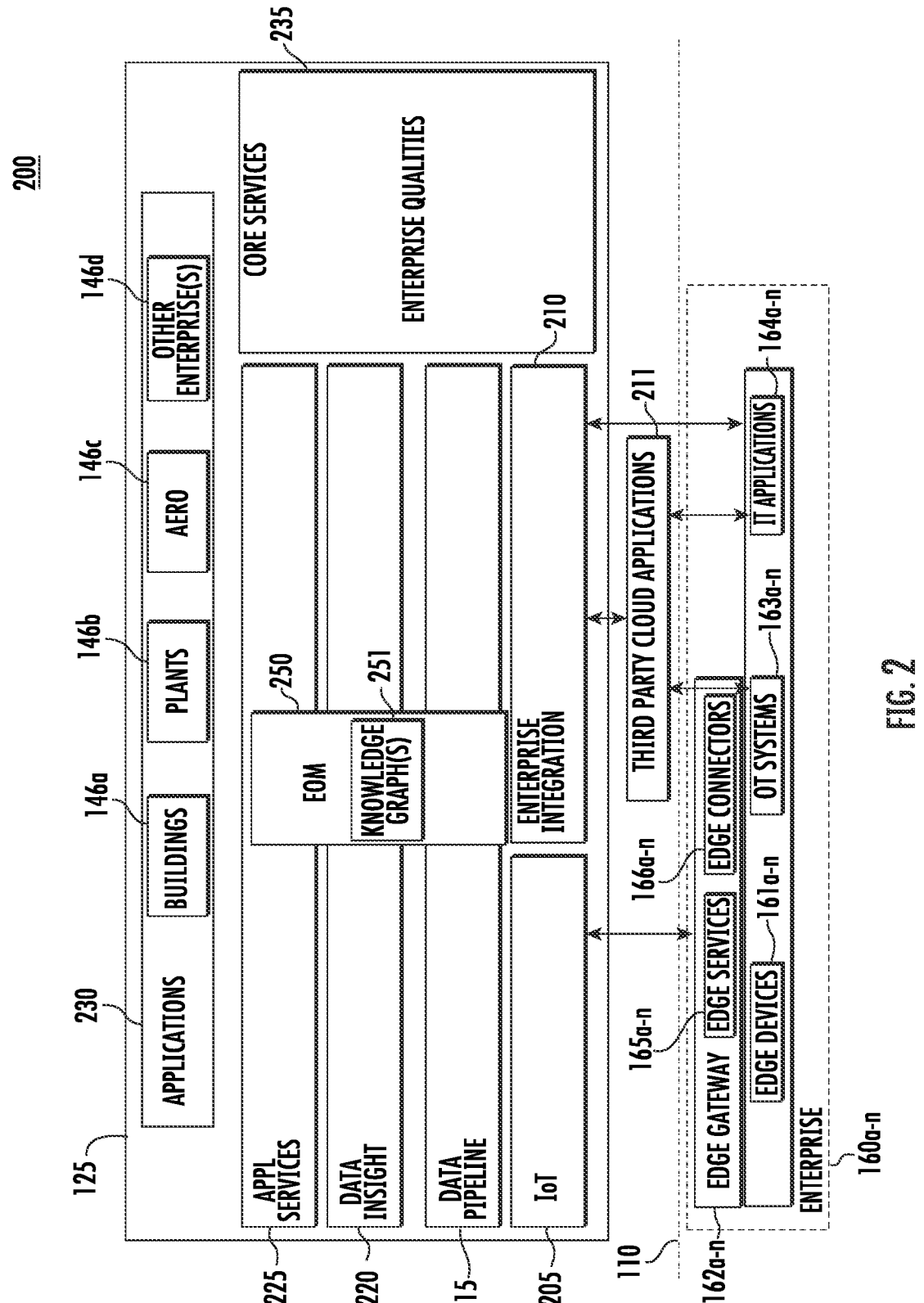
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include sensors (e.g., one or more air quality sensors, one or more humidity sensors, one or more temperature sensors, one or more air flow sensor, and/or one or more other sensors), air handler units, fans, actuators, processors, computers, valves, pumps, ducts, vehicle components, cameras, displays, doors, windows, security components, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, in certain embodiments, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a key performance indicator (KPI) framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

In certain embodiments, the modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 251 receives "TMP" during the modeling phase and determine that "TMP" relates to "temperature." The generated models are then published. In certain embodiments, the complex onboarding process includes the knowledge graph 251 receiving the raw model data, receiving point history data, and receiving site survey data. According to various embodiments, the knowledge graph 251 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, in one or more embodiments, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a fan template defines fan efficiency calculations such that every time a fan is configured, the standard efficiency calculation is automatically executed for the fan. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, curve fitting models, regression analysis models, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about optimal corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, in certain embodiments, process design is integrated with feed conditions. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146*a-d*. The applications layer 230 includes one or more applications 146*a-d* of the IoT platform 125. For example, according to various embodiments, the applications 146*a-d* includes a buildings application 146*a*, a plants application 146*b*, an aero application 146*c*, and other enterprise applications 146*d*. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance, asset health, and/or asset predictive maintenance. According to various embodiments, autonomous control includes energy optimization and/or predictive maintenance. As detailed above, according to various embodiments, the general applications 146 is extensible such that each application 146 is configurable for the different types of enterprises 160*a*-160*n* (e.g., buildings application 146*a*, plants application 146*b*, aero application 146*c*, and other enterprise applications 146*d*).

The applications layer 230 also enables visualization of performance of the enterprise 160*a*-160*n*. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
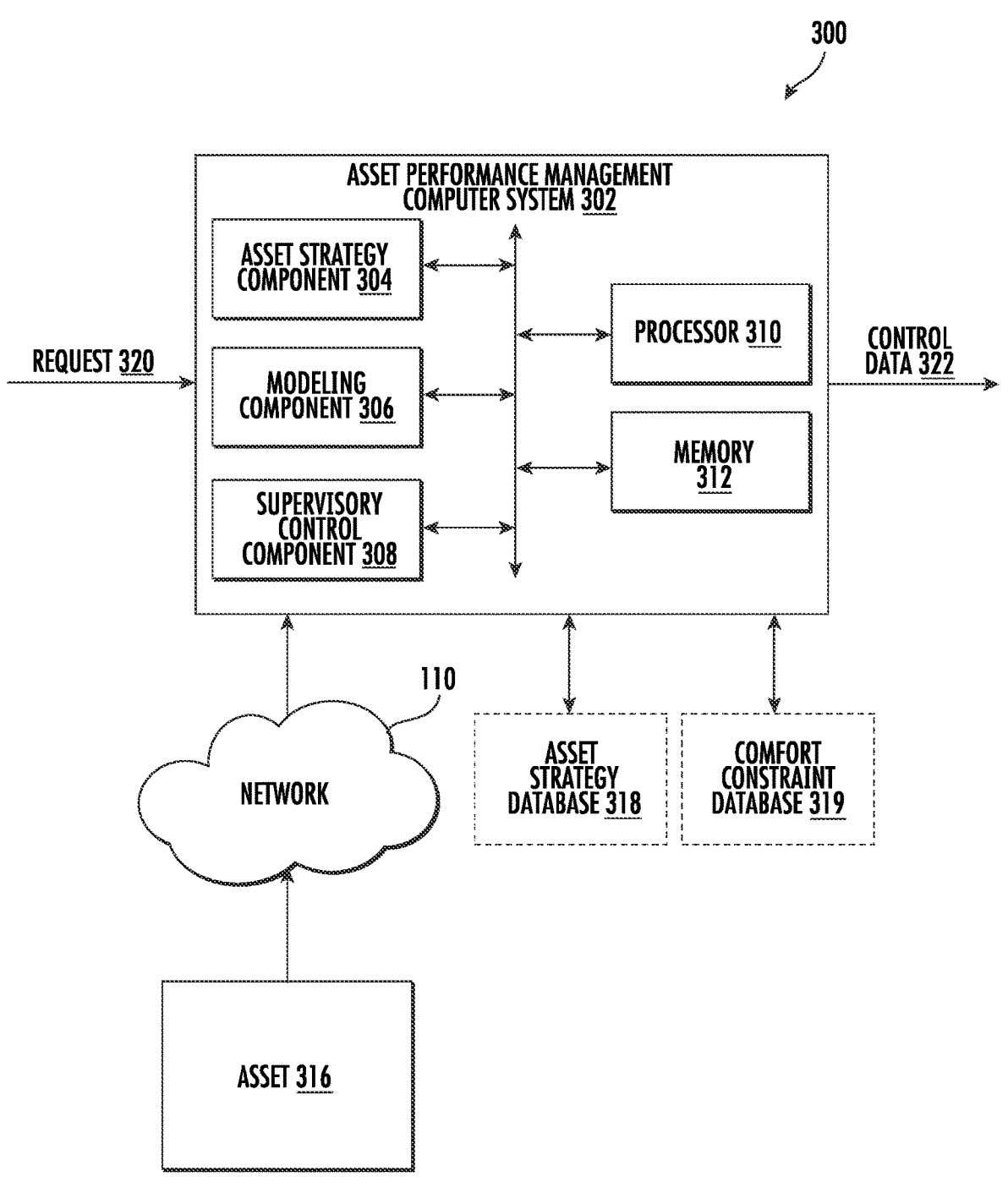
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset performance management computer system 302 to facilitate a practical application of data modeling technology, digital transformation technology, supervisory control technology, asset energy optimization technology, and/or smart building technology to provide optimization related to one or more assets in an enterprise environment (e.g., one or more assets in a building environment, etc.). In one or more embodiments, the asset performance management computer system 302 facilitates a practical application of machine learning technology to provide optimization related to enterprise performance management. In one or more embodiments, the asset performance management computer system 302 analyzes asset data, asset strategies and/or comfort constraints related to one or more assets and/or one or more environments related to one or more assets to provide cost saving supervisory control and/or improved supervisory control efficiency for the one or more assets.

In an embodiment, the asset performance management computer system 302 is a server system (e.g., a server device) that facilitates a cloud-based supervisory control platform between one or more computing devices and one or more assets. In one or more embodiments, the asset performance management computer system 302 is a device with one or more processors and a memory. In one or more embodiments, the asset performance management computer system 302 is a computer system from the computer systems 120. For example, in one or more embodiments, the asset performance management computer system 302 is implemented via the cloud 105. The asset performance management computer system 302 is also related to one or more technologies, such as, for example, enterprise technologies, smart building technologies, connected building technologies, connected asset technologies, connected edge-device technologies, HVAC technologies, modeling technologies, energy optimization technologies, predictive maintenance technologies, asset performance management technologies, data analytics technologies, digital transformation technologies, cloud computing technologies, cloud database technologies, server technologies, network technologies, wireless communication technologies, machine learning technologies, artificial intelligence technologies, digital processing technologies, electronic device technologies, computer technologies, sensor technologies, Internet of Things (IoT) technologies, industrial technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies.

Moreover, the asset performance management computer system 302 provides an improvement to one or more technologies such as enterprise technologies, smart building technologies, connected building technologies, connected asset technologies, connected edge-device technologies, HVAC technologies, modeling technologies, energy optimization technologies, predictive maintenance technologies, asset performance management technologies, data analytics technologies, digital transformation technologies, cloud computing technologies, cloud database technologies, server technologies, network technologies, wireless communication technologies, machine learning technologies, artificial intelligence technologies, digital processing technologies, electronic device technologies, computer technologies, sensor technologies, IoT technologies, industrial technologies, supply chain analytics technologies, aircraft technologies, cybersecurity technologies, navigation technologies, asset visualization technologies, oil and gas technologies, petrochemical technologies, refinery technologies, process plant technologies, procurement technologies, and/or one or more other technologies. In an implementation, the asset performance management computer system 302 improves performance of one or more assets. For example, in one or more embodiments, the asset performance management computer system 302 improves processing efficiency of one or more assets, reduces power consumption of one or more assets, optimizes energy usage related to one or more assets, etc. Additionally or alternatively, in another implementation, the asset performance management computer system 302 improves performance of a computing device. For example, in one or more embodiments, the asset performance management computer system 302 improves processing efficiency of a computing device (e.g., a server), reduces power consumption of a computing device (e.g., a server), improves quality of data provided by a computing device (e.g., a server), etc.

The asset performance management computer system 302 includes an asset strategy component 304, a modeling component 306 and/or a supervisory control component 308. Additionally, in certain embodiments, the asset performance management computer system 302 includes a processor 310 and/or a memory 312. In certain embodiments, one or more aspects of the asset performance management computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset performance management computer system 302, a remote processor (e.g., a processor implemented on a server), and/or a virtual machine. In certain embodiments, the processor 310 is in communication with the memory 312, the asset strategy component 304, the modeling component 306 and/or the supervisory control component 308 via a bus to, for example, facilitate transmission of data among the processor 310, the memory 312, the asset strategy component 304, the modeling component 306 and/or the supervisory control component 308. The processor 310 may embodied in a number of different ways and can, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset performance management computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset performance management computer system 302 (e.g., the asset strategy component 304 of the asset performance management computer system 302) receives a request 320. In an embodiment, the request 320 is a request to perform supervisory control with respect to one or more assets such as, for example, asset 316. In one or more embodiments, the asset 316 is associated with components of the edge 115 such as, for example, one or more enterprises 160a-160n. In one or more embodiments, the asset 316 is an edge device from the one or more edge devices 161a-161n. In certain embodiments, the asset 316 is an air handler unit that includes a fan. However, it is to be appreciated that, in certain embodiments, the asset 316 is another type of asset. In one or more embodiments, the asset performance management computer system 302 is in communication with the asset 316 via the network 110. For example, in certain embodiments, the asset performance management computer system 302 receives data from the asset 316 via the network 110 and/or transmits data to the asset 316 via the network 110. In certain embodiments, the asset 316 incorporates encryption capabilities to facilitate encryption of one or more portions of data received from the asset 316 and/or one or more portions of data transmitted to the asset 316. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network.

In one or more embodiments, the request 320 includes an asset identifier that indicates an identity of the asset 316. The asset identifier in the request 320 is a digital code such as, for example, a machine-readable code, a combination of numbers and/or letters, a string of bits, a barcode, a Quick Response (QR) code, an industrial asset tag number (e.g., an industrial equipment tag number), a digital label, a photo of the asset 316, or another type of identifier for the asset 316. Furthermore, the asset identifier in the request 320 facilitates identification of the asset 316. For instance, in an embodiment, the asset strategy component 304 employs the asset identifier to identify (e.g., uniquely identify) an asset identifier for the asset 316, a name of the asset 316, a type of asset for the asset 316, a description of the asset 316, and/or other identification information related to the asset 316.

The modeling component 306 employs the asset identifier to facilitate modeling related to supervisory control of the asset 316. In one or more embodiments, in response to the request 320, the modeling component 306 determines one or more setpoints for the asset 316 based on the asset identifier. For example, in one or more embodiments, the modeling component 306 employs the asset identifier to determine one or more setpoints for the asset 316. In certain embodiments, the modeling component 306 queries an asset strategy database 318 based on the asset identifier to determine the one or more setpoints for the asset 316. For instance, in one or more embodiments, the asset strategy database 318 stores asset strategy data associated with one or more asset strategies for one or more assets. In one or more embodiments, an asset strategy may be an operation scenario (e.g., an operation strategy) related to energy demand constraints for an asset. For example, in one or more embodiments, an asset strategy includes configuration information for respective assets to facilitate energy demand optimization for the respective assets. In one or more embodiments, the asset strategy data includes one or more setpoints for respective asset strategies for respective assets. A setpoint is an asset setting (e.g., an asset setpoint) for a respective asset. For instance, in one or more embodiments, the one or more setpoints include one or more voltage values, one or more current values, one or more switch states, and/or one or more other configuration settings for respective assets. In certain embodiments, the asset strategy data includes information related to a predefined list of setpoints for the asset 316, a predefined list of settings for the asset 316, configuration information for the asset 316, a state of the asset 316, real-time settings for the asset 316, maintenance history for the asset 316, information related to sensors associated with the asset 316, and/or other asset strategy information associated with the asset 316. In certain embodiments, the asset strategy component 304 determines one or more setpoints from respective portions of asset strategy data associated with an operation scenario (e.g., an operation strategy) for the asset 316. In certain embodiments, the modeling component 306 performs a setpoint optimization process for the asset strategy data in response to a determination that the asset 316 is associated a transition between an on state and an off state. For example, in certain embodiments, the request 320 is generated in response to a determination that the asset 316 is associated a transition between an on state and an off state.

Additionally or alternatively, in response to the request 320, the modeling component 306 determines comfort constraint data based on the asset identifier. The comfort constraint data is indicative of one or more comfort constraints for an environment associated with the asset 316. For example, in one or more embodiments, the comfort constraint data includes environment comfort criteria and/or environment comfort variables for the environment that includes the asset 316. The environment is, for example, a building zone (e.g., a building room, a building floor, a building structure, etc.), an industrial zone, or another type of indoor environment that includes the asset 316. In certain embodiments, the modeling component 306 queries a comfort constraint database 319 based on the asset identifier to determine the comfort constraint data. For instance, in one or more embodiments, the asset strategy database 318 stores comfort constraint data associated with one or more asset environments. In an embodiment, the comfort constraint data includes occupancy data for the environment. For example, the occupancy data may include information regarding a degree of occupancy (e.g., high occupancy, average occupancy, low occupancy, etc.) of people within the environment. In certain embodiments, the modeling component 306 determines the occupancy data based on location data (e.g., global positioning system (GPS) data) related to respective computing devices for respective people within the environment. Additionally or alternatively, in an embodiment, the comfort constraint data includes temperature data indicative of a temperature for the environment that includes the asset 316. For example, the temperature data may include an HVAC temperature setpoint for the asset 316. Additionally or alternatively, in an embodiment, the comfort constraint data includes temperature data for another environment proximate to the environment that includes the asset 316. For example, the temperature data may include temperature information for another building zone (e.g., another building room, another building floor, another building structure, etc.), another industrial zone, or another indoor environment proximate to the environment that includes the asset 316. Additionally or alternatively, in an embodiment, the comfort constraint data includes occupancy state data indicative of an occupancy state for the environment. For example, the occupancy state data may include information regarding whether or not at least one person is present within the environment. In certain embodiments, the modeling component 306 determines the occupancy state data based on location data (e.g., GPS data) related to at least one computing devices employed by at least one person within the environment.

The supervisory control component 308 performs supervisory control with respect to the asset. To facilitate the supervisory control, in one or more embodiments, the supervisory control component 308 generates control data 322 that includes one or more adjusted setpoints (e.g., one or more new setpoint values) for the asset 316. In one or more embodiments, the supervisory control component 308 adjusts the one or more setpoints for the asset 316 based on the comfort constraint data. In certain embodiments, the supervisory control component 308 adjusts the one or more setpoints for the asset 316 by a defined amount in response to a determination that the occupancy data satisfies a defined criterion. For example, the supervisory control component 308 may increase the one or more setpoints for the asset 316 by a defined amount in response to a determination that the occupancy data corresponds to a low occupancy threshold. In another example, the supervisory control component 308 may decrease the one or more setpoints for the asset 316 by a defined amount in response to a determination that the occupancy data corresponds to a high occupancy threshold.

In certain embodiments, the supervisory control component 308 repeatedly adjusts the one or more setpoints by a defined amount and/or for a defined period of time in response to a determination that the temperature data is altered. For example, the supervisory control component 308 may repeatedly adjust the one or more setpoints by a defined amount and/or for a defined period of time in response to a change for a temperature setpoint for the asset 316. In certain embodiments, the supervisory control component 308 adjusts the one or more setpoints for the asset 316 by a defined amount in response to a determination that temperature data for another environment proximate to the environment satisfies a defined criterion. For example, the supervisory control component 308 may increase the one or more setpoints for the asset 316 by a defined amount in response to a determination that temperature data for another environment proximate to the environment corresponds to a high temperature threshold. In another example, the supervisory control component 308 may decrease the one or more setpoints for the asset 316 by a defined amount in response to a determination that temperature data for another environment proximate to the environment corresponds to a low temperature threshold.

In certain embodiments, the supervisory control component 308 repeatedly adjusts the one or more setpoints by a defined amount and/or for a defined period of time in response to a determination that the occupancy state is altered. For example, the supervisory control component 308 may repeatedly increase the one or more setpoints by a first defined amount (e.g., a first exponential decay value) and/or for a first defined period of time in response to a determination that the occupancy state transitions to an unoccupied state. Furthermore, the supervisory control component 308 may repeatedly decrease the one or more setpoints by a second defined amount (e.g., a second exponential decay value) and/or for a second defined period of time in response to a determination that the occupancy state transitions to an occupied state. In certain embodiments, the supervisory control component 308 switches a first asset strategy for the asset 316 to a second asset strategy in response to a determination that predicted uncertainty (e.g., a predicted model uncertainty, an error prediction, etc.) related to the comfort constraint data satisfies a defined threshold level. The first asset strategy may include a first set of setpoints for the asset 316 and the second asset strategy may include a second set of setpoints for the asset that is different than the first set of setpoints. In certain embodiments, switching between a first asset strategy and a second asset strategy is performed via switches implemented via the asset 316 and/or a controller configured to control the asset 316.

In certain embodiments, to facilitate generation of the asset strategy data for the asset strategy database 318, the asset strategy component 304 estimates one or more baseline values (e.g., one or more baseline setpoint values) for the asset 316 based on a regression analysis process (e.g., a regression analysis modeling technique) associated with the asset 316. For example, in certain embodiments, the asset strategy component 304 estimates one or more baseline values for the asset 316 based on Gaussian process regression (e.g., a machine learning technique associated with Gaussian processes) associated with the asset 316. Furthermore, in certain embodiments, the asset strategy component 304 generates at least a portion of the asset strategy data stored in the asset strategy database 318 based on the one or more baseline values.

In one or more embodiments, the modeling component 306 performs a machine learning process with respect to the asset strategy data and/or the comfort constraint data to determine one or more adjusted setpoints for the asset 316. In certain embodiments, the modeling component 306 determines one or more adjusted setpoints for the asset 316 based on relationships, correlations and/or predictions between aspects of the asset strategy data and/or the comfort constraint data using a regression analysis modeling technique, a curve fitting modeling technique, a clustering technique, and/or another type of modeling technique. However, it is to be appreciated that, in certain embodiments, the modeling component 306 employs a different type of modeling technique to determine one or more adjusted setpoints for the asset 316. In one or more embodiments, the one or more optimal adjusted setpoints for the asset 316 are one or more optimal setpoints related to energy optimization for the asset 316. In one or more embodiments, the control data 322 includes the one or more adjusted setpoints for the asset 316 and/or one or more control signals to adjust one or more setpoints for the asset 316 to the one or more adjusted setpoints.

In one or more embodiments, the modeling component 306 determines predicted uncertainty associated with one or more adjusted setpoints for the asset 316. In response to a determination that the predicted uncertainty associated with one or more adjusted setpoints for the asset 316 is above a defined uncertainty threshold, an original asset strategy is employed for the asset 316. However, in response to a determination that the predicted uncertainty associated with one or more adjusted setpoints for the asset 316 is below a defined uncertainty threshold, the asset 316 is configured with the one or more adjusted setpoints (e.g., an optimized asset strategy for the asset 316 is employed).

In certain embodiments, the modeling component 306 determines training data generated by the asset 316 in the environment over a certain interval of time. Furthermore, in certain embodiments, the modeling component 306 generates at least a portion of the asset strategy data based on the training data. In certain embodiments, the modeling component 306 determines historical training data associated with another asset that is different than the asset 316. In one example, the other asset associated with the historical training data is located in the environment that includes the asset 316. In another example, the other asset associated with the historical training data is located in a different environment than the environment that includes the asset 316. Furthermore, in certain embodiments, the modeling component 306 generates at least a portion of the asset strategy data for the asset 316 based on the historical training data.

In certain embodiments, the supervisory control component 308 performs one or more other actions based on the one or more setpoints for the asset 316. For example, in certain embodiments, the supervisory control component 308 performs one or more other actions in response to adjusting the one or more setpoints for the asset 316 and/or in response to determining values for the one or more adjusted setpoints. In certain embodiments, the supervisory control component 308 renders a user interface to configure one or more portions of the asset strategy data In certain embodiments, in response to the adjusting the one or more setpoints for the asset, the supervisory control component 308 renders a user interface to display one or more adjusted setpoint values for the one or more setpoints.

In an embodiment, the supervisory control component 308 generates a user-interactive electronic interface that renders a visual representation of the one or more setpoints. For example, in an embodiment, the supervisory control component 308 configures a visualization (e.g., a dashboard visualization for display via a user interface of a computing device). In another embodiment, the supervisory control component 308 transmits, to a computing device, one or more notifications associated with the one or more setpoints. In an exemplary embodiment, a notification advises that the asset 316 is operating inefficiently (e.g., wasting energy). In another exemplary embodiment, a notification indicates one or more optimal setpoints for the asset 316. In another exemplary embodiment, a notification includes information regarding an automated service for the asset 316 to provide, for example, possible savings greater than given setpoint for the asset 316. In another embodiment, the supervisory control component 308 modifies one or more setpoints for the asset 316 based on control data (e.g., user remote control feedback data) for the asset 316 that is provided via an electronic interface of a computing device. In another embodiment, the supervisory control component 308 generates one or more work orders for the asset 316 based on work order data for the asset 316 that is provided via an electronic interface of a computing device. In another embodiment, the supervisory control component 308 determines likelihood of success for a new asset strategy associated with the asset 316. In another embodiment, the supervisory control component 308 retrains one or more portions of the model based on the one or more adjusted setpoints. For example, in certain embodiments, the supervisory control component 308 modifies one or more values and/or one or more weights for the model. In another embodiment, the supervisory control component 308 performs another type of action associated with the application services layer 225, the applications layer 230, and/or the core services layer 235.

Figure 4:
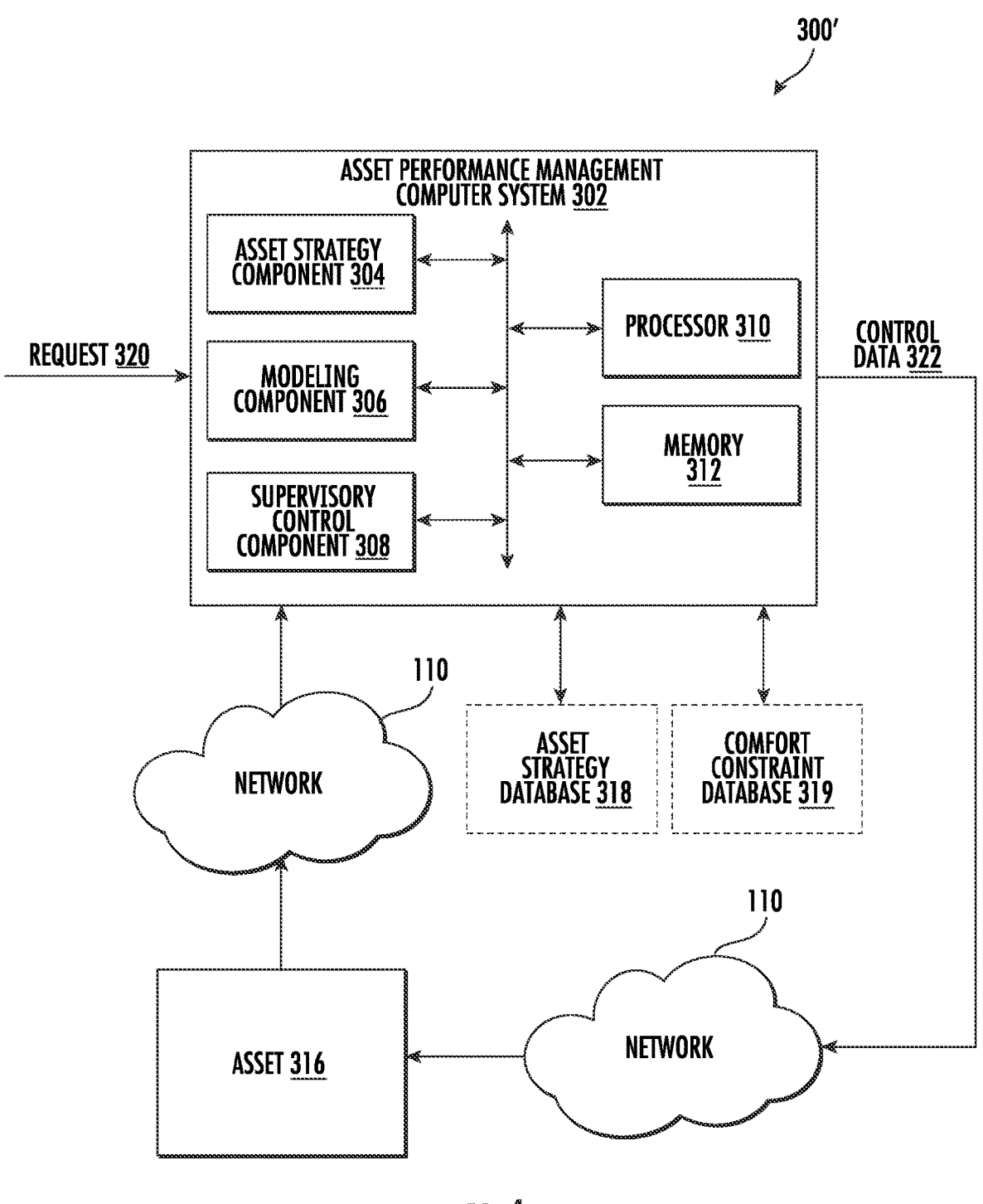
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the asset performance management computer system 302, the asset 316, the asset strategy database 318, and/or the comfort constraint database 319. In one or more embodiments, the asset performance management computer system 302 is in communication with the asset 316 via the network 110. In one or more embodiments, control data 322 is configured to modify one or more setpoints for the asset 316. For instance, in one or more embodiments, the control data 322 is provided to the asset 316 to modify one or more setpoints for the asset 316. In an embodiment, the supervisory control component 308 determines one or more adjusted setpoints for the asset 316 based on the comfort constraint data.

Figure 5:
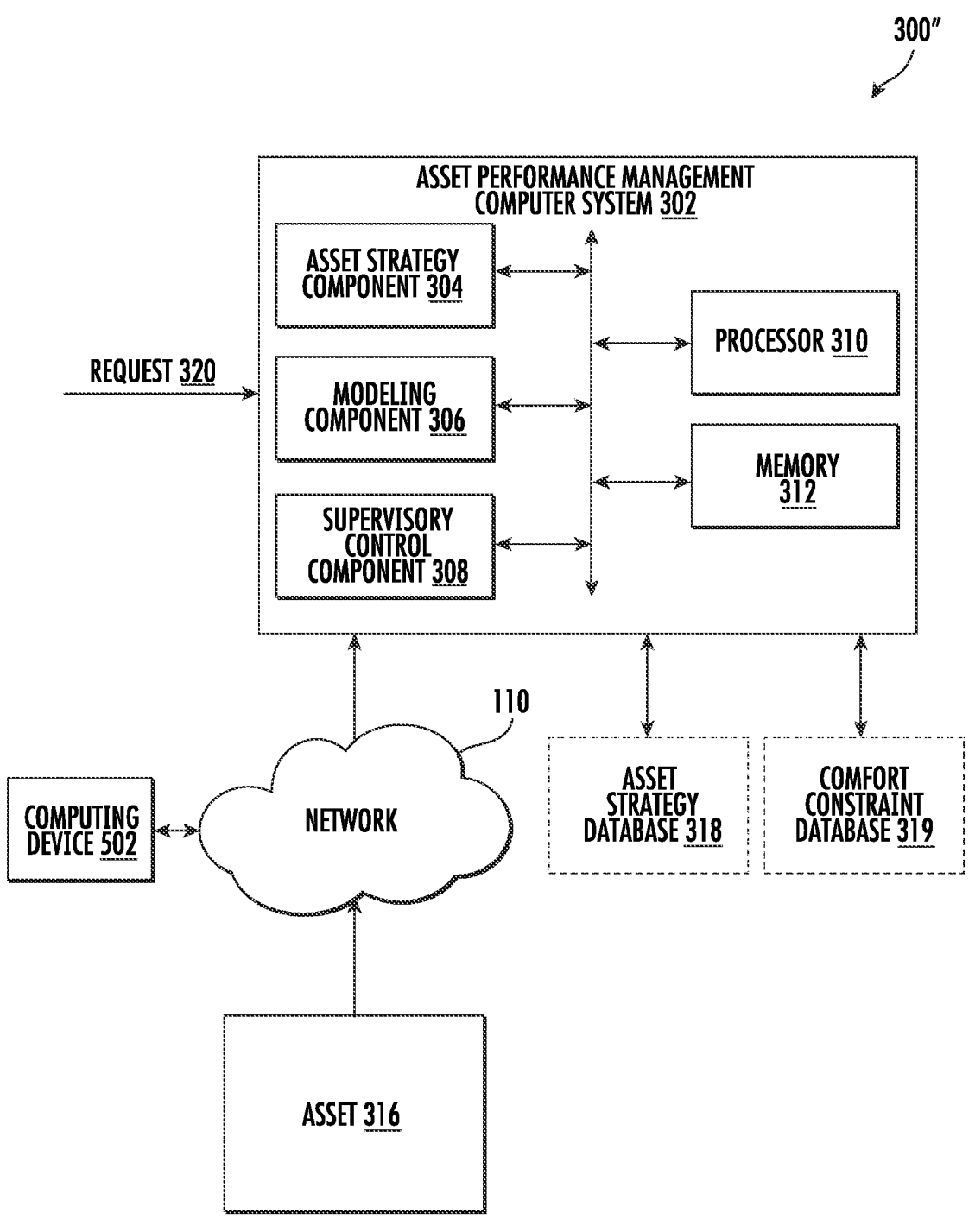
FIG. 5 illustrates yet another system that provides an exemplary environment, in accordance with one or more embodiments described herein.

FIG. 5 illustrates a system 300" that provides an exemplary environment according to one or more described features of one or more embodiments of the disclosure. In an embodiment, the system 300" corresponds to an alternate embodiment of the system 300 shown in FIG. 3 and/or the system 300' shown in FIG. 4. According to an embodiment, the system 300" includes the asset performance management computer system 302, the asset 316, the asset strategy database 318, the comfort constraint database 319, and/or a computing device 502. In one or more embodiments, the asset performance management computer system 302 is in communication with the asset 316 and/or the computing device 502 via the network 110. The computing device 502 is a mobile computing device, a smartphone, a tablet computer, a mobile computer, a desktop computer, a laptop computer, a workstation computer, a wearable device, a virtual reality device, an augmented reality device, or another type of computing device located remote from the asset performance management computer system 302.

In one or more embodiments, the supervisory control component 308 communicates the control data 322 to the computing device 502. For example, in one or more embodiments, the control data 322 includes one or more visual elements for a visual display (e.g., a user interface, a user-interactive electronic interface, etc.) of the computing device 502 that renders a visual representation of one or more portions of the asset strategy data, one or more adjusted setpoint values for the one or more setpoints, and/or other information related to the asset 316. In certain embodiments, the visual display of the computing device 502 displays one or more graphical elements associated with one or more portions of the asset strategy data, one or more adjusted setpoint values for the one or more setpoints, and/or other information related to the asset 316. In certain embodiments, the visual display of the computing device 502 provides a graphical user interface to facilitate managing setpoints associated with the asset 316, data use associated with the asset 316, costs associated with the asset 316, maintenance associated with the asset 316, asset planning associated with the asset 316, asset services associated with the asset 316, asset operations associated with the asset 316, and/or one or more other aspects of the asset 316. In certain embodiments, the visual display of the computing device 502 provides a graphical user interface to present one or more notifications associated with one or more portions of the asset strategy data, one or more adjusted setpoint values for the one or more setpoints, and/or other information related to the asset 316. In one or more embodiments, the visual display of the computing device 502 is configured to allow a user associated with the computing device 502 to make decisions and/or perform one or more actions with respect to the asset 316.

Figure 6:
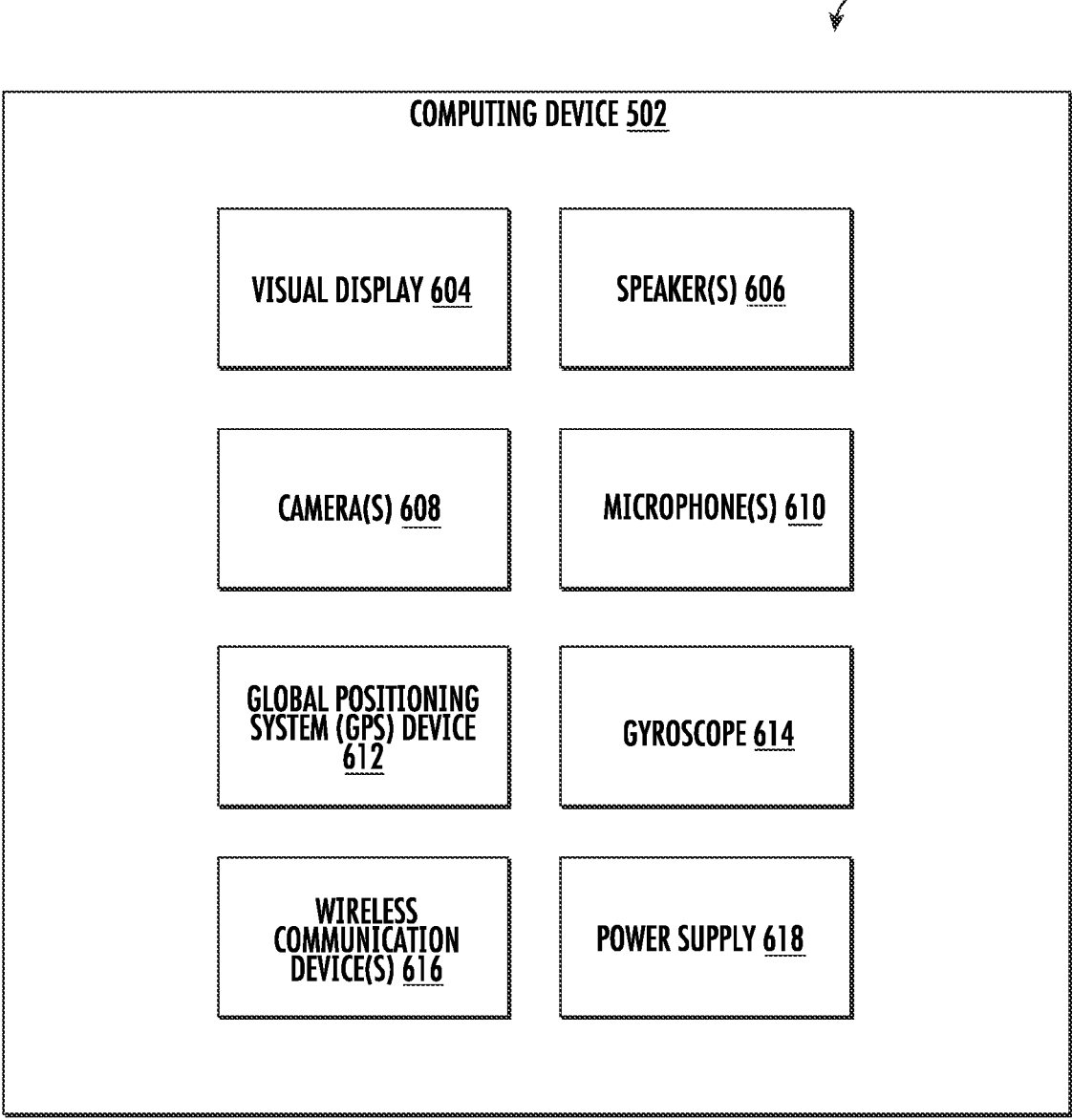
FIG. 6 illustrates an exemplary computing device, in accordance with one or more embodiments described herein.

FIG. 6 illustrates a system 500 according to one or more embodiments of the disclosure. The system 600 includes the computing device 502. In one or more embodiments, the computing device 502 employs mobile computing, cloud-based computing, IoT technology, augmented reality, and/or one or more other technologies to provide video, audio, real-time data, graphical data, one or more communications one or more messages, one or more notifications, asset identifier details, and/or other media data associated with the asset 316. The computing device 502 includes mechanical components, electrical components, hardware components and/or software components to facilitate adjusting one or more setpoints associated with the asset 316 and/or to facilitate presenting information related to the asset 316. In the embodiment shown in FIG. 6, the computing device 502 includes a visual display 604, one or more speakers 606, one or more cameras 608, one or more microphones 610, a GPS device 612, a gyroscope 614, one or more wireless communication devices 616, and/or a power supply 618.

In an embodiment, the visual display 604 is a display that facilitates presentation and/or interaction with one or more portions of the asset strategy data, one or more adjusted setpoint values for the one or more setpoints, and/or other information related to the asset 316. In one or more embodiments, the computing device 502 displays an electronic interface (e.g., a user interface, a graphical user interface, etc.) associated with a supervisory control platform associated with the asset 316. In one or more embodiments, the visual display 604 is a visual display that renders one or more interactive media elements via a set of pixels. The one or more speakers 606 include one or more integrated speakers that project audio. The one or more cameras 608 include one or more cameras that employ autofocus and/or image stabilization for photo capture and/or real-time video. The one or more microphones 610 include one or more digital microphones and/or one or more analog microphones that employ audio capturing and/or active noise cancellation to capture audio data. The GPS device 612 provides a geographic location (e.g., GPS coordinates) for the computing device 502. The gyroscope 614 provides an orientation for the computing device 502. The one or more wireless communication devices 616 includes one or more hardware components to provide wireless communication via one or more wireless networking technologies and/or one or more short-wavelength wireless technologies. The power supply 618 is, for example, a power supply and/or a rechargeable battery that provides power to the visual display 604, the one or more speakers 606, the one or more cameras 608, the one or more microphones 610, the GPS device 612, the gyroscope 614, and/or the one or more wireless communication devices 616. In certain embodiments, at least a portion of the control data 322 is presented via the visual display 604 and/or the one or more speakers 606.

Figure 7:
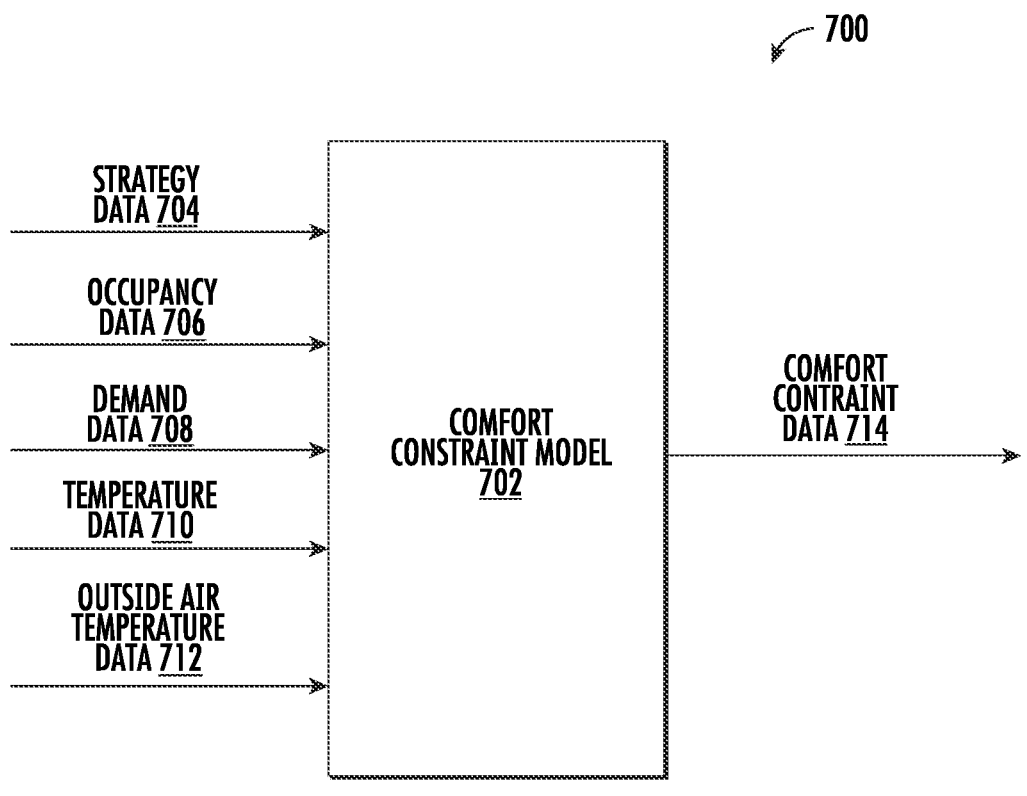
FIG. 7 illustrates a system associated with a comfort constraint model, in accordance with one or more embodiments described herein.

FIG. 7 illustrates a system 700 according to one or more described features of one or more embodiments of the disclosure. In an embodiment, the system 700 includes a comfort constraint model 702. The comfort constraint model 702 is, for example, a model executed by the modeling component 306 to generate comfort constraint data 714. The comfort constraint data 714 is, for example, one or more comfort constraint values for an asset (e.g., the asset 316). In one or more embodiments, the comfort constraint data 714 includes one or more baseline values (e.g., one or more baseline setpoint values) for an asset (e.g., the asset 316). According to various embodiments, the comfort constraint model 702 generates the comfort constraint data 714 based on strategy data 704, occupancy data 706, demand data 708, temperature data 710, outside air temperature data 712, and/or other data. In one or more embodiments, the strategy data 704 is indicative of an original strategy (e.g., original switch settings, predetermined setpoint values, pre-optimized setpoint values, etc.) for the asset 316. In one or more embodiments, the occupancy data 706 is indicative of a degree of occupancy (e.g., high occupancy, average occupancy, low occupancy, etc.) of people within an environment that includes the asset 316. In one or more embodiments, the demand data 708 is indicative of energy demand constraints for the asset 316. In one or more embodiments, the temperature data 710 is indicative of one or more temperature settings (e.g., one or more temperature limits, one or more temperature thresholds, one or more temperature setpoints, one or more temperature targets, etc.) for an environment that includes the asset 316. In one or more embodiments, the outside air temperature data 712 is indicative of a temperature outside of an environment that includes the asset 316 (e.g., outside a building, etc.). In certain embodiments, the outside air temperature data 712 is indicative of a temperature for an environment (e.g., a downstream environment with respect to the asset 316) that is different than an environment that includes the asset 316. In an embodiment, the comfort constraint model 702 is configured for regression analysis with respect to the strategy data 704, the occupancy data 706, the demand data 708, the temperature data 710, and/or the outside air temperature data 712. For example, in one or more embodiments, the comfort constraint model 702 is configured for Gaussian process regression with respect to the strategy data 704, the occupancy data 706, the demand data 708, the temperature data 710, and/or the outside air temperature data 712. In a non-limiting example, the comfort constraint model 702 is a percentile model configured for percentile regression associated with an energy optimization target for the asset 316.

Figure 8:
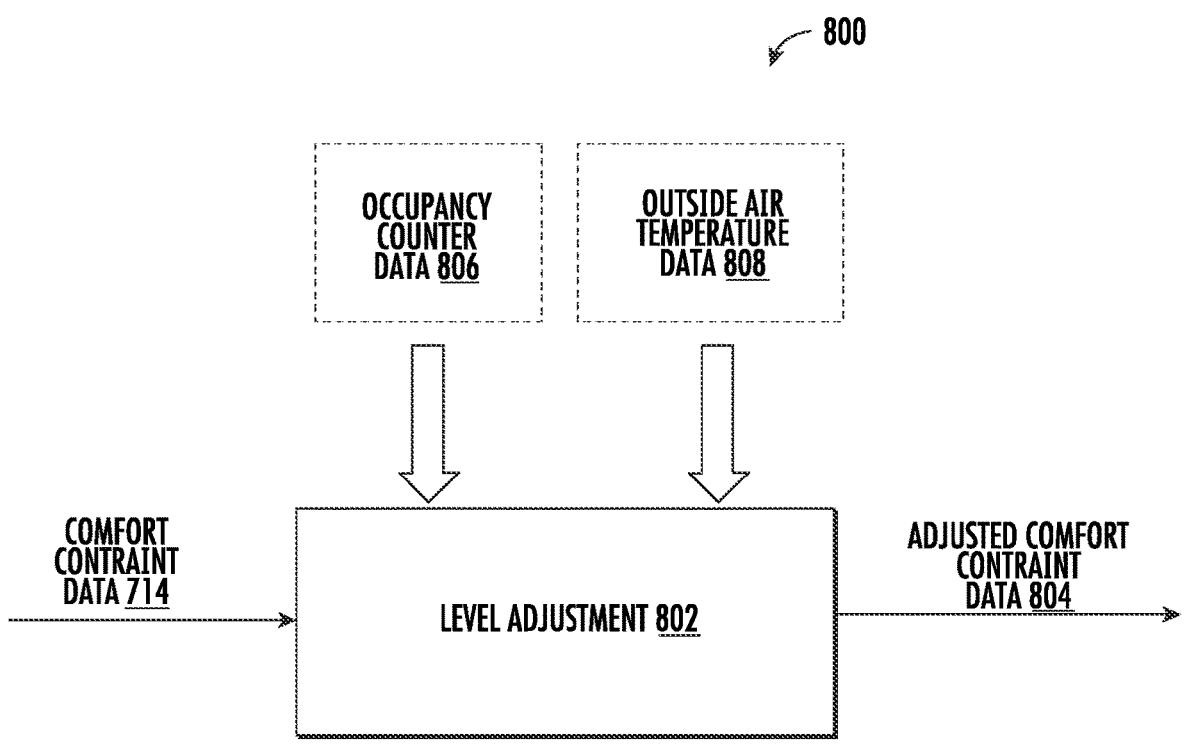
FIG. 8 illustrates a system associated with level adjustment of one or more comfort constraints, in accordance with one or more embodiments described herein.

FIG. 8 illustrates a system 800 according to one or more described features of one or more embodiments of the disclosure. In an embodiment, the system 800 includes level adjustment 802. For instance, in certain embodiments, the level adjustment 802 adjusts the comfort constraint data 714 generated by the comfort constraint model 702 by a predetermined level to generate adjusted comfort constraint data 804. The adjusted comfort constraint data 804 is, for example, one or more adjusted comfort constraint values for an asset (e.g., the asset 316). In one or more embodiments, the adjusted comfort constraint data 804 includes one or more adjusted baseline values (e.g., one or more adjusted baseline setpoint values) for an asset (e.g., the asset 316). In certain embodiments, the level adjustment 802 employs criteria associated with occupancy counter data 806 and/or outside air temperature data 808 to determine the adjusted comfort constraint data 804. In one or more embodiments, the occupancy counter data 806 indicates a degree of occupancy (e.g., high occupancy, average occupancy, low occupancy, etc.) of people within an environment that includes the asset 316. For instance, the occupancy counter data 806 may indicate a number of people within an environment that includes the asset 316. In one or more embodiments, the outside air temperature data 808 is indicative of a temperature outside of an environment that includes the asset 316 (e.g., outside a building, etc.). In certain embodiments, the outside air temperature data 808 is indicative of a temperature for an environment (e.g., a downstream environment with respect to the asset 316) that is different than an environment that includes the asset 316. For example, in certain embodiments, the outside air temperature data 808 is indicative of temperature data for another environment proximate to the environment that includes the asset 316.

In certain embodiments, the level adjustment 802 adjusts the comfort constraint data 714 by a defined amount in response to a determination that the occupancy counter data 806 satisfies a defined criterion. For example, the level adjustment 802 may increase one or more comfort constraint values for the comfort constraint data 714 by a defined amount in response to a determination that the occupancy counter data 806 corresponds to a low occupancy threshold (e.g., in response to a determination that the occupancy counter data 806 is below a defined threshold value). In another example, the level adjustment 802 may decrease the one or more comfort constraint values for the comfort constraint data 714 by a defined amount in response to a determination that the occupancy counter data 806 corresponds to a high occupancy threshold (e.g., in response to a determination that the occupancy counter data 806 is above a defined threshold value).

In certain embodiments, the level adjustment 802 adjusts the comfort constraint data 714 by a defined amount in response to a determination that the outside air temperature data 808 satisfies a defined criterion. For example, the level adjustment 802 may increase one or more comfort constraint values for the comfort constraint data 714 by a defined amount in response to a determination that the outside air temperature data 808 corresponds to a high temperature threshold. In another example, the level adjustment 802 may decrease one or more comfort constraint values for the comfort constraint data 714 by a defined amount in response to a determination that the outside air temperature data 808 corresponds to a low temperature threshold.

Figure 9:
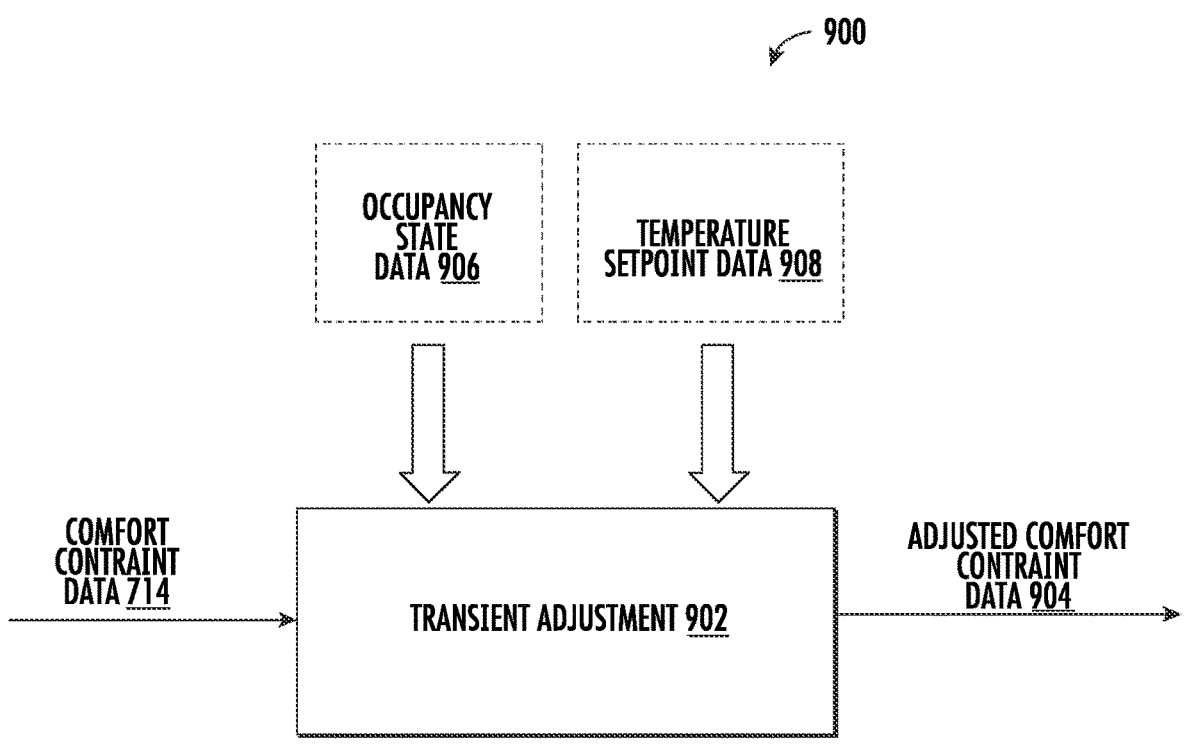
FIG. 9 illustrates a system associated with transient adjustment of one or more comfort constraints, in accordance with one or more embodiments described herein.

FIG. 9 illustrates a system 900 according to one or more described features of one or more embodiments of the disclosure. In an embodiment, the system 900 includes transient adjustment 902. For instance, in certain embodiments, the transient adjustment 902 adjusts the comfort constraint data 714 generated by the comfort constraint model 702 via transient adjustment to generate adjusted comfort constraint data 904. The adjusted comfort constraint data 904 is, for example, one or more adjusted comfort constraint values for an asset (e.g., the asset 316). In one or more embodiments, the adjusted comfort constraint data 904 includes one or more adjusted baseline values (e.g., one or more adjusted baseline setpoint values) for an asset (e.g., the asset 316). In certain embodiments, the transient adjustment 902 employs criteria associated with occupancy state data 906 and/or temperature setpoint data 908 to determine the adjusted comfort constraint data 904. In one or more embodiments, occupancy state data 906 indicates indicative of an occupancy state for an environment that includes the asset 316. For example, the occupancy state data 906 may include information regarding whether or not at least one person is present within an environment that includes the asset 316. In one or more embodiments, the temperature setpoint data 908 indicates a temperature setpoint for an environment that includes the asset 316.

In certain embodiments, the transient adjustment 902 repeatedly adjusts increase one or more comfort constraint values for the comfort constraint data 714 by a defined amount and/or for a defined period of time (e.g., via transient adjustment) in response to a determination that the occupancy state data 906 is altered. For example, the transient adjustment 902 may repeatedly increase one or more comfort constraint values for the comfort constraint data 714 by a first defined amount (e.g., a first exponential decay value) and/or for a first defined period of time (e.g., via transient adjustment) in response to a determination that an occupancy state of the occupancy state data 906 transitions to an unoccupied state. Furthermore, the transient adjustment 902 may repeatedly decrease one or more setpoint values for the comfort constraint data 714 by a second defined amount (e.g., a second exponential decay value) and/or for a second defined period of time (e.g., via transient adjustment) in response to a determination that an occupancy state of the occupancy state data 906 transitions to an occupied state. In certain embodiments, the transient adjustment 902 repeatedly adjusts one or more comfort constraint values for the comfort constraint data 714 by a defined amount and/or for a defined period of time (e.g., via transient adjustment) in response to a determination that the temperature setpoint data 908 is altered. For example, the transient adjustment 902 may repeatedly adjust one or more comfort constraint values for the comfort constraint data 714 by a defined amount and/or for a defined period of time (e.g., via transient adjustment) in response to a change for a temperature setpoint for the asset 316.

Figure 10:
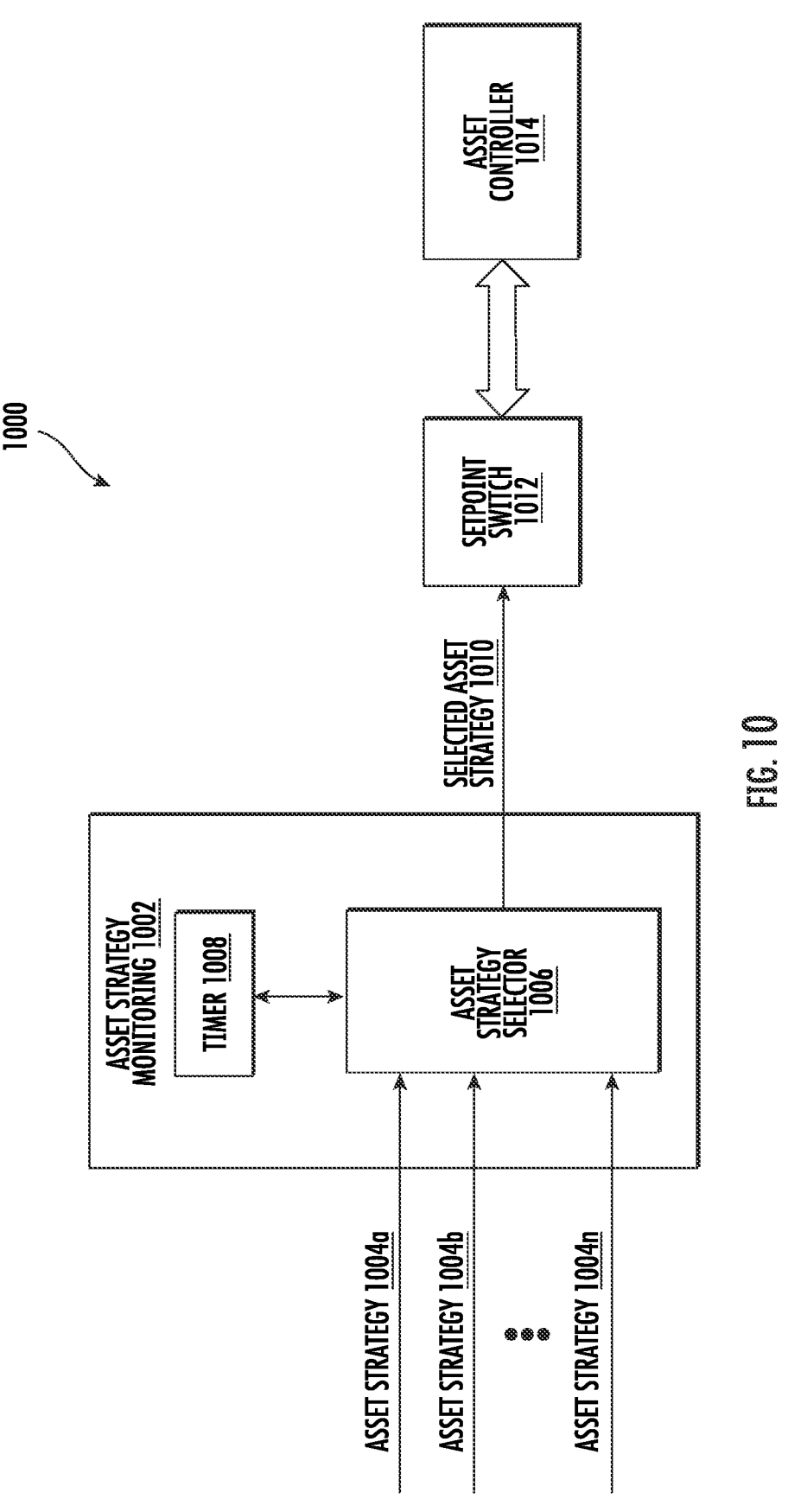
FIG. 10 illustrates a system associated with asset strategy monitoring, in accordance with one or more embodiments described herein.

FIG. 10 illustrates a system 1000 according to one or more described features of one or more embodiments of the disclosure. In an embodiment, the system 1000 includes asset strategy monitoring 1002. The asset strategy monitoring 1002 is configured to monitor one or more asset strategies 1004*a-n*. In certain embodiments, the asset strategy monitoring 1002 includes an asset strategy selector 1006 that selects an asset strategy from the one or more asset strategies 1004*a-n*. For example, in certain embodiments, the asset strategy monitoring 1002 provides selected asset strategy 1010 that corresponds to an asset strategy selected from the one or more asset strategies 1004*a-n*. In certain embodiments, the asset strategy monitoring 1002 employs a timer 1008 that determines frequency of monitoring of the one or more asset strategies 1004*a-n*. In certain embodiments, a setpoint switch 1012 for the selected asset strategy 1010 is performed to adjust one or more setpoints for the selected asset strategy 1010. In certain embodiments, an asset controller 1014 adjusts an asset (e.g., the asset 316) based on the one or more adjusted setpoints provided by the setpoint switch 1012.

Figure 11:
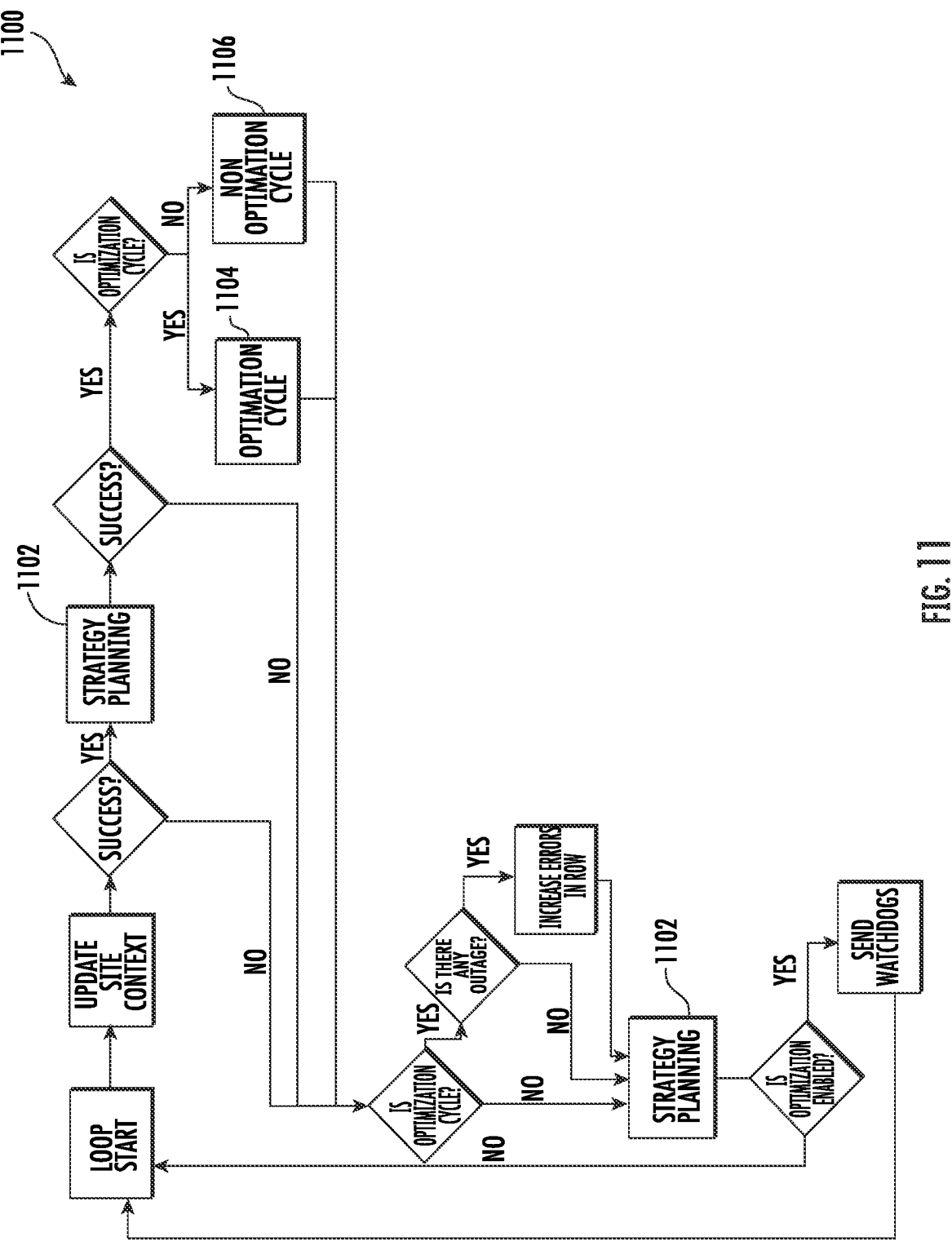
FIG. 11 illustrates a processing workflow associated with asset strategy monitoring, in accordance with one or more embodiments described herein.

FIG. 11 illustrates processing workflow 1100 according to one or more described features of one or more embodiments of the disclosure. In an embodiment, the processing workflow 1100 corresponds to a monitoring process performed by the asset strategy monitoring 1002. In one or more embodiments, the processing workflow 1100 includes strategy planning 1102, an optimization cycle 1104, and/or a non-optimization cycle 1106. In certain embodiments, processing workflow 1100 repeatedly checks (e.g., every minute) for any outages associated with the asset 316. In response to an outage, the processing workflow 1110 disables optimization. Alternatively, in response to occurrence of no outages, the processing workflow 1110 enables optimization. In certain embodiments, the processing workflow 1110 enables/disables optimization based on a manual request, outages associated with the asset 316, and/or one or more errors associated with the asset 316.

Figure 12:
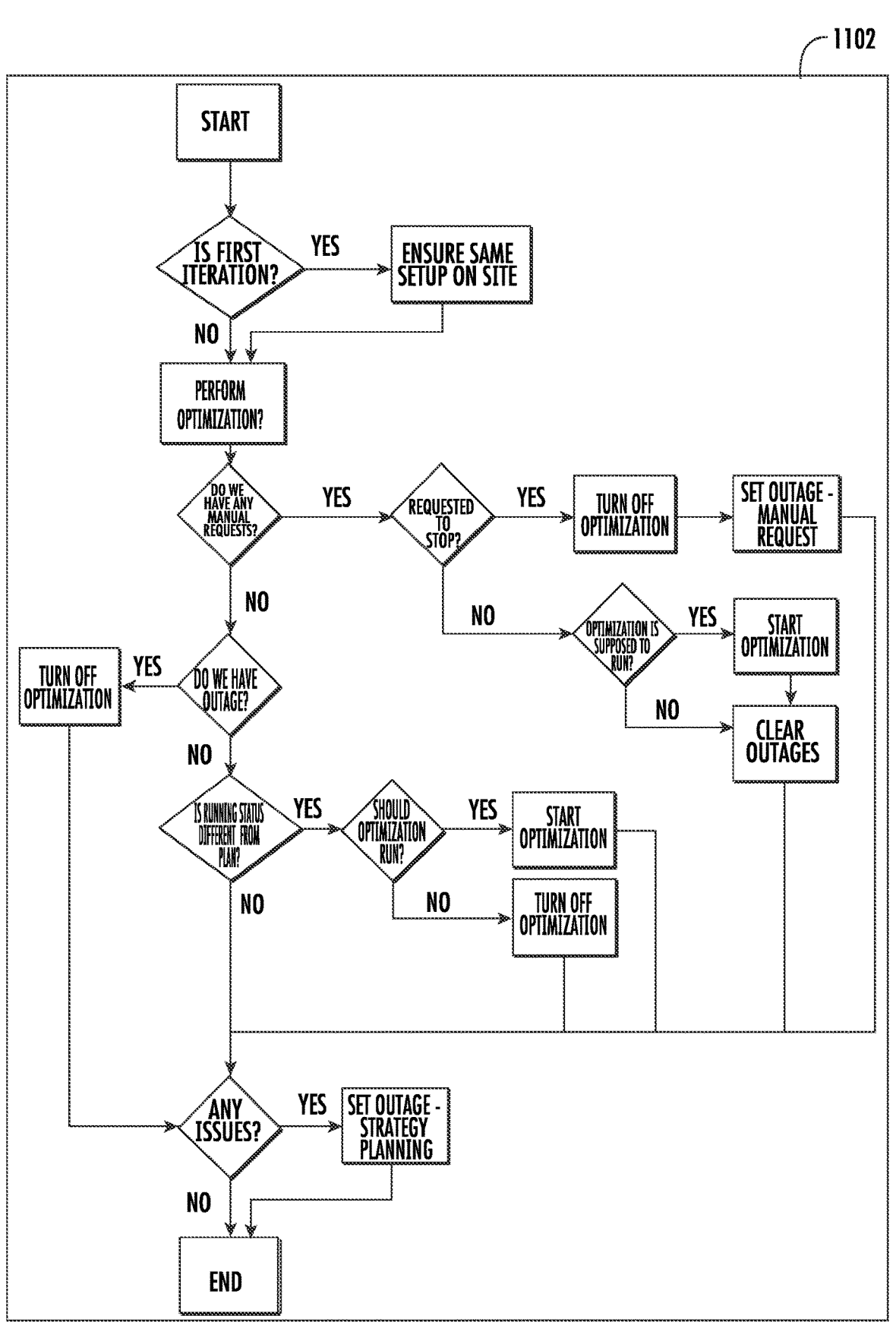
FIG. 12 illustrates strategy planning associated with asset strategy monitoring, in accordance with one or more embodiments described herein.

FIG. 12 illustrates the strategy planning 1102 according to one or more described features of one or more embodiments of the disclosure. For a first iteration of the strategy planning 1102, the strategy planning 1102 ensures that the site set-up is the same (e.g., to verify that state of the asset 316 as assumed by the asset performance management computer system 302 is the same as on site). In certain embodiments, the strategy planning 1102 performs optimization in response to a determination that errors associated with the asset 316 is below a predefined error counter threshold). In certain embodiments, the strategy planning 1102 withholds from performing optimization in response to a determination that a manual request for adjusting a setpoint for the asset 316 is received from the computing device 502. In certain embodiments, the strategy planning 1102 withholds from performing optimization in response to a determination that an outage is identified with respect to the asset 316.

Figure 13:
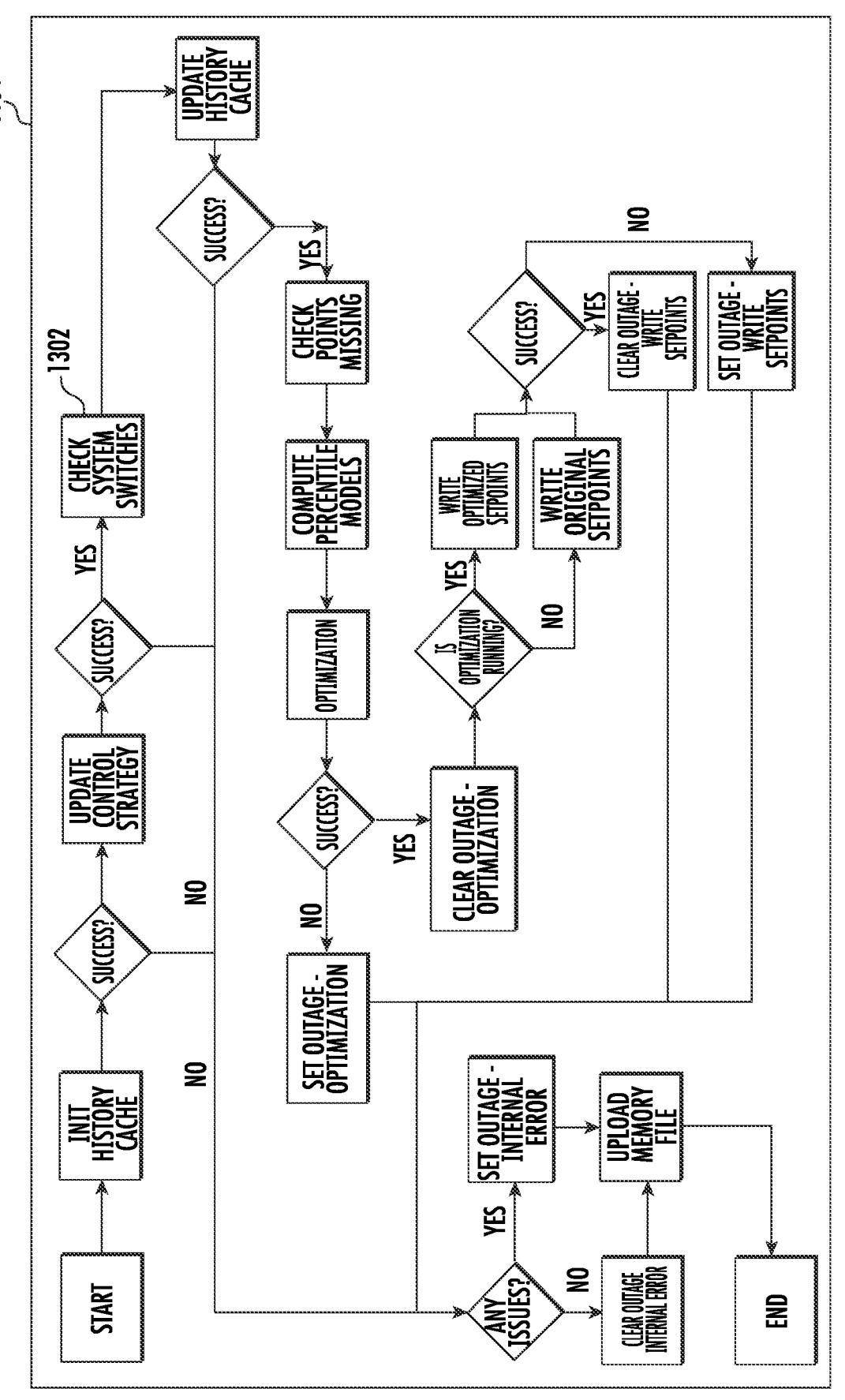
FIG. 13 illustrates an optimization cycle associated with asset strategy monitoring, in accordance with one or more embodiments described herein.

FIG. 13 illustrates the optimization cycle 1104 according to one or more described features of one or more embodiments of the disclosure. In one or more embodiments, the optimization cycle 1104 performs an optimization process to optimize one or more setpoints for the asset 316. In one or more embodiments, the optimization cycle 1104 initializes history cache and/or updates a control strategy signal for the asset 316. In one or more embodiments, the optimization cycle 1104 configures the asset 316 with the optimized setpoints in response to a determination that the optimization process is successfully completed. In one or more embodiments, the optimization cycle 1104 generates training data and/or generates a memory file related to optimization of the setpoints response to a determination that the optimization process is successfully completed.

Figure 14:
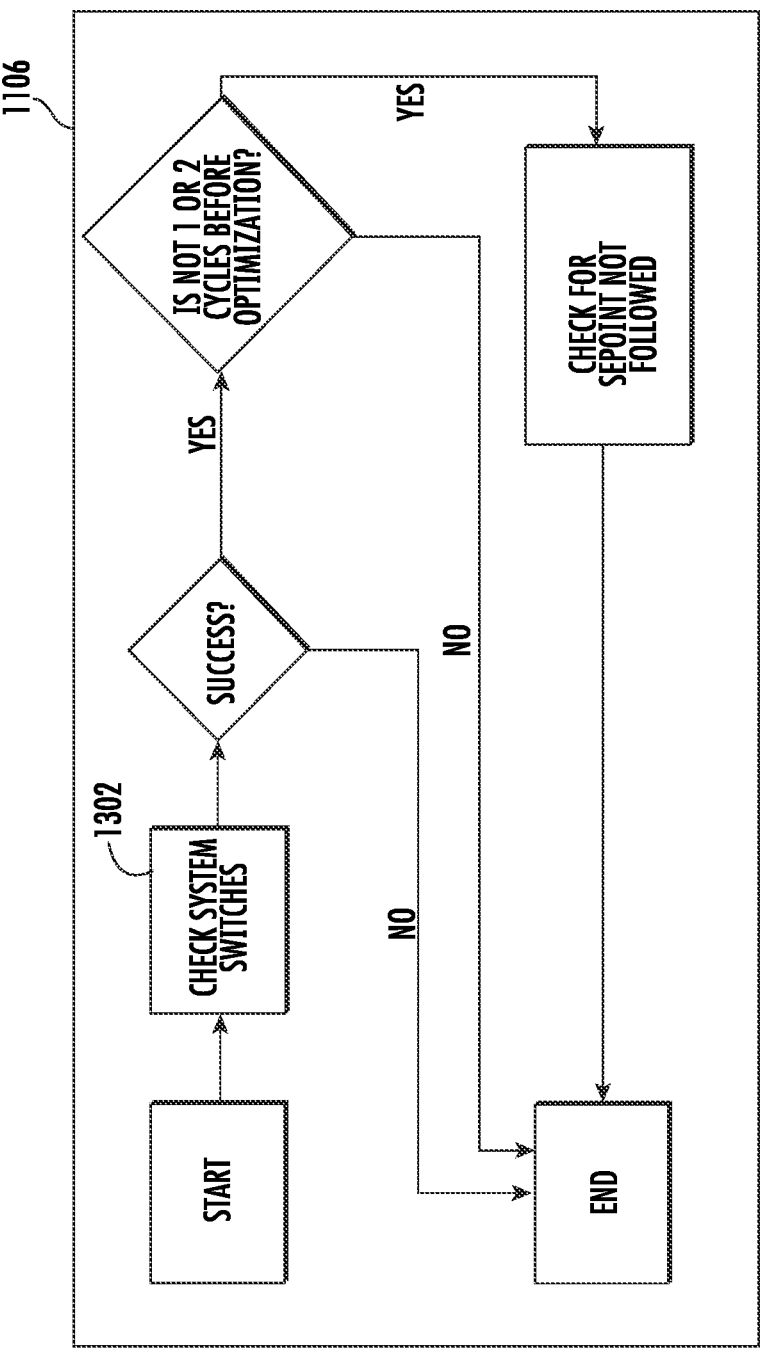
FIG. 14 illustrates a non-optimization cycle associated with asset strategy monitoring, in accordance with one or more embodiments described herein.

FIG. 14 illustrates the non-optimization cycle 1106 according to one or more described features of one or more embodiments of the disclosure. In one or more embodiments, the non-optimization cycle 1106 performs the check system switches process 1302. In one or more embodiments, in response to a determination that a sufficient amount of time prior to initiation of the optimization cycle 1104 is available, the non-optimization cycle 1106 checks whether one or more setpoints for the asset 316 is or are being followed by process variable.

Figure 15:
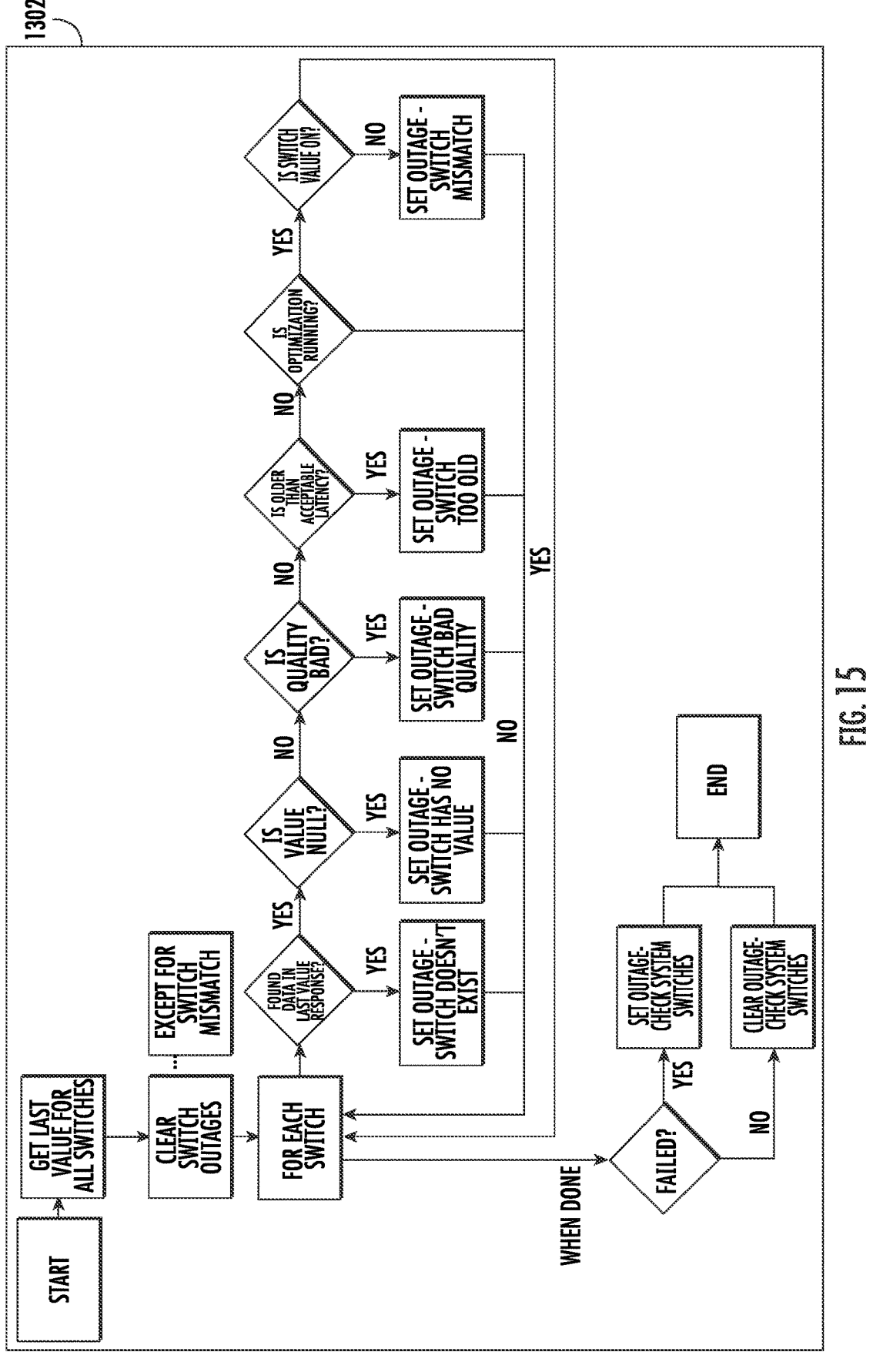
FIG. 15 illustrates a check system switches process associated with asset strategy monitoring, in accordance with one or more embodiments described herein.

FIG. 15 illustrates the check system switches process 1302 according to one or more described features of one or more embodiments of the disclosure. The check system switches process 1302 is employed to detect various situations related to the asset 316 such as, for example, if the switch point does not exist, if the switch point received no values, if the switch point was received with higher than accepted data latency, if the switch point received sub-optimal quality data, if the switch point received another value than an expected value, etc.

Figure 16:
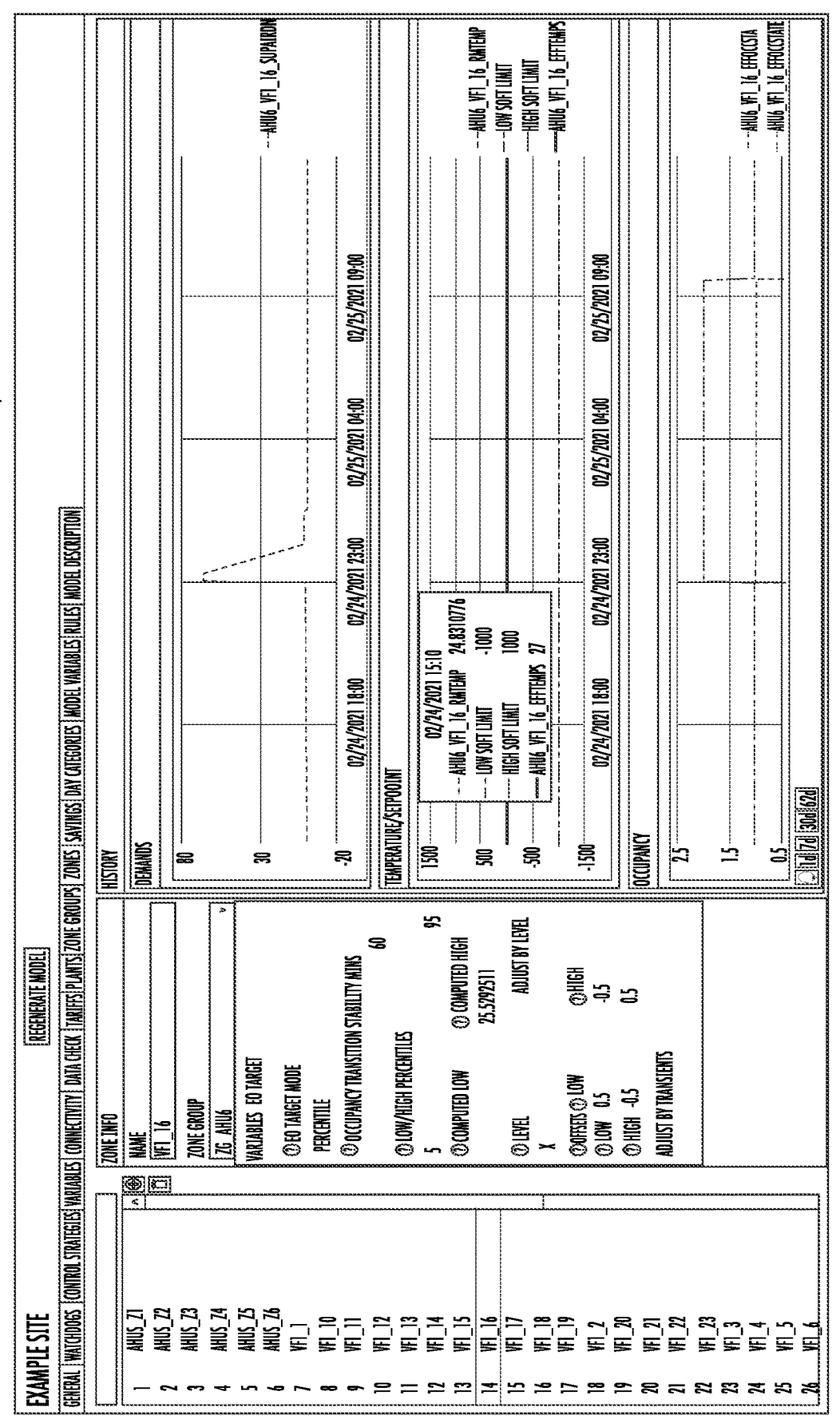
FIG. 16 illustrates an exemplary user interface, in accordance with one or more embodiments described herein.

FIG. 16 illustrates an exemplary user interface 1600 according to one or more embodiments of the disclosure. In an embodiment, the user interface 1600 is a user interface of the computing device 502 that is presented via the visual display 604. In certain embodiments, a visualization presented via the user interface 1600 presents information related to the comfort constraints model/or and comfort constraints data for an environment associated with the asset

316. In certain embodiments, the user interface 1600 facilitates remote control of one or more portions of the asset 316. For example, in certain embodiments, the user interface 1600 facilitates modification of one or more parameters related to energy optimization for the asset 316.

FIG. 17 illustrates an exemplary user interface 1700 according to one or more embodiments of the disclosure. In an embodiment, the user interface 1700 is a user interface of the computing device 502 that is presented via the visual display 604. In certain embodiments, a visualization presented via the user interface 1700 presents information related to comfort constraints data for an environment associated with the asset 316. In certain embodiments, the user interface 1700 facilitates display of zones related to one or more assets, issue activity information, comfort limits for respective zones related to one or more assets, a status of respective zones related to one or more assets, a suggested comfort target for respective assets, and/or information related to actions for respective assets. In certain embodiments, issue activity information presents the proportion of time the comfort constraint was breached (e.g., the comfort constraint failed to comply with one or more comfort constraint criteria) for a given zone related to one or more assets.

Figure 18:
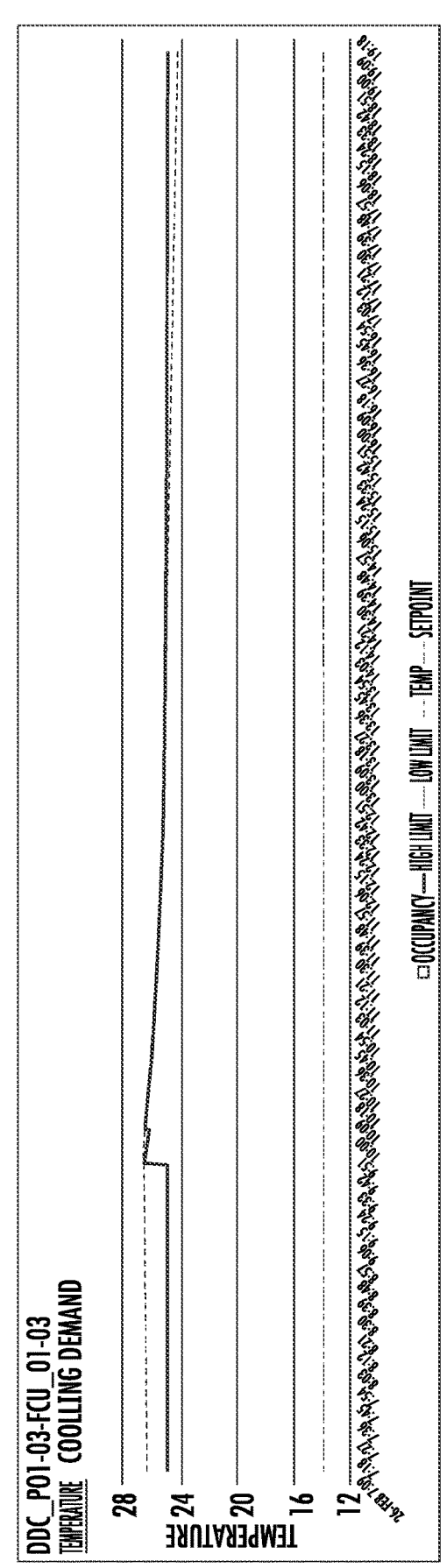
FIG. 18 illustrates another exemplary user interface, in accordance with one or more embodiments described herein.

FIG. 18 illustrates an exemplary user interface 1800 according to one or more embodiments of the disclosure. In an embodiment, the user interface 1800 is a user interface of the computing device 502 that is presented via the visual display 604. In certain embodiments, a visualization presented via the user interface 1800 presents information related to comfort constraints data for an environment associated with the asset 316. In certain embodiments, the user interface 1800 facilitates a visual comparison between a high comfort limit, a low comfort limit, temperature data, and/or a current setpoint value for an environment associated with the asset 316.

Figure 19:
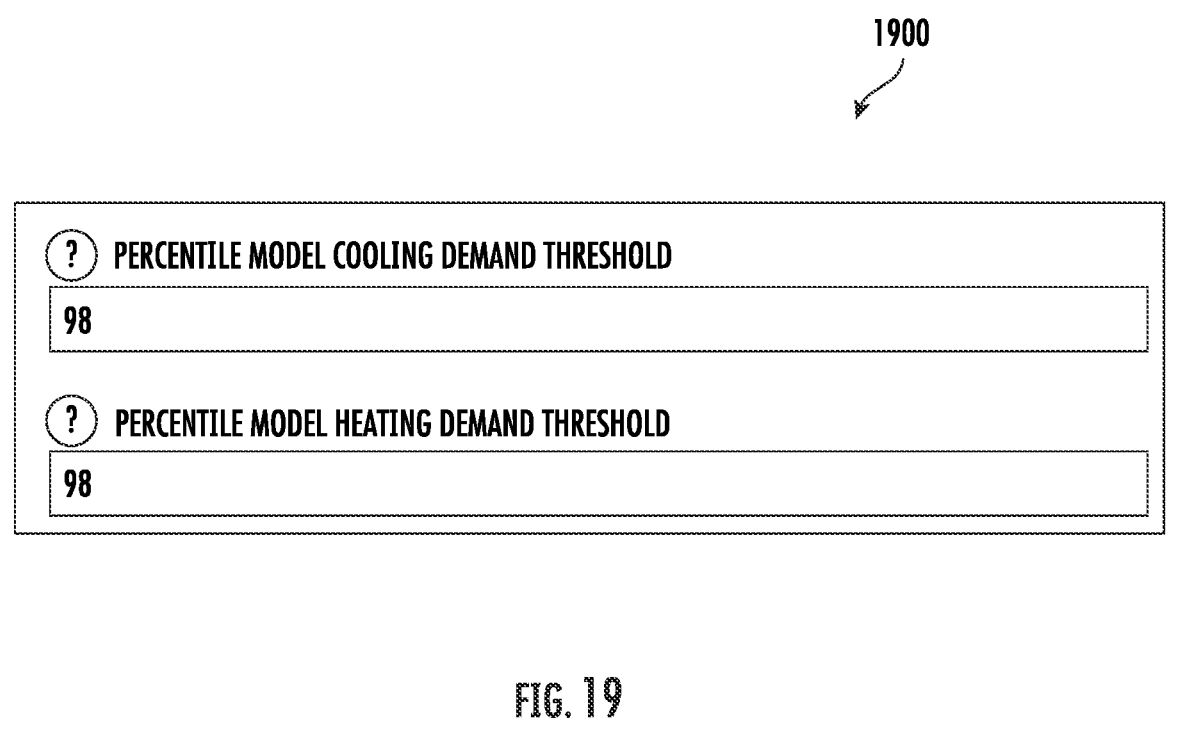

FIG. 19 illustrates an exemplary user interface 1900 according to one or more embodiments of the disclosure. In an embodiment, the user interface 1900 is a user interface of the computing device 502 that is presented via the visual display 604. In certain embodiments, a visualization presented via the user interface 1900 presents information related to an environment associated with the asset 316. In certain embodiments, the user interface 1900 allows configuration of one or more parameters for the comfort constraint model 702. In certain embodiments, the user interface 1900 allows configuration of comfort constraints (e.g., a cooling demand threshold and/or a heating demand threshold) for the comfort constraint model 702.

Figure 20:
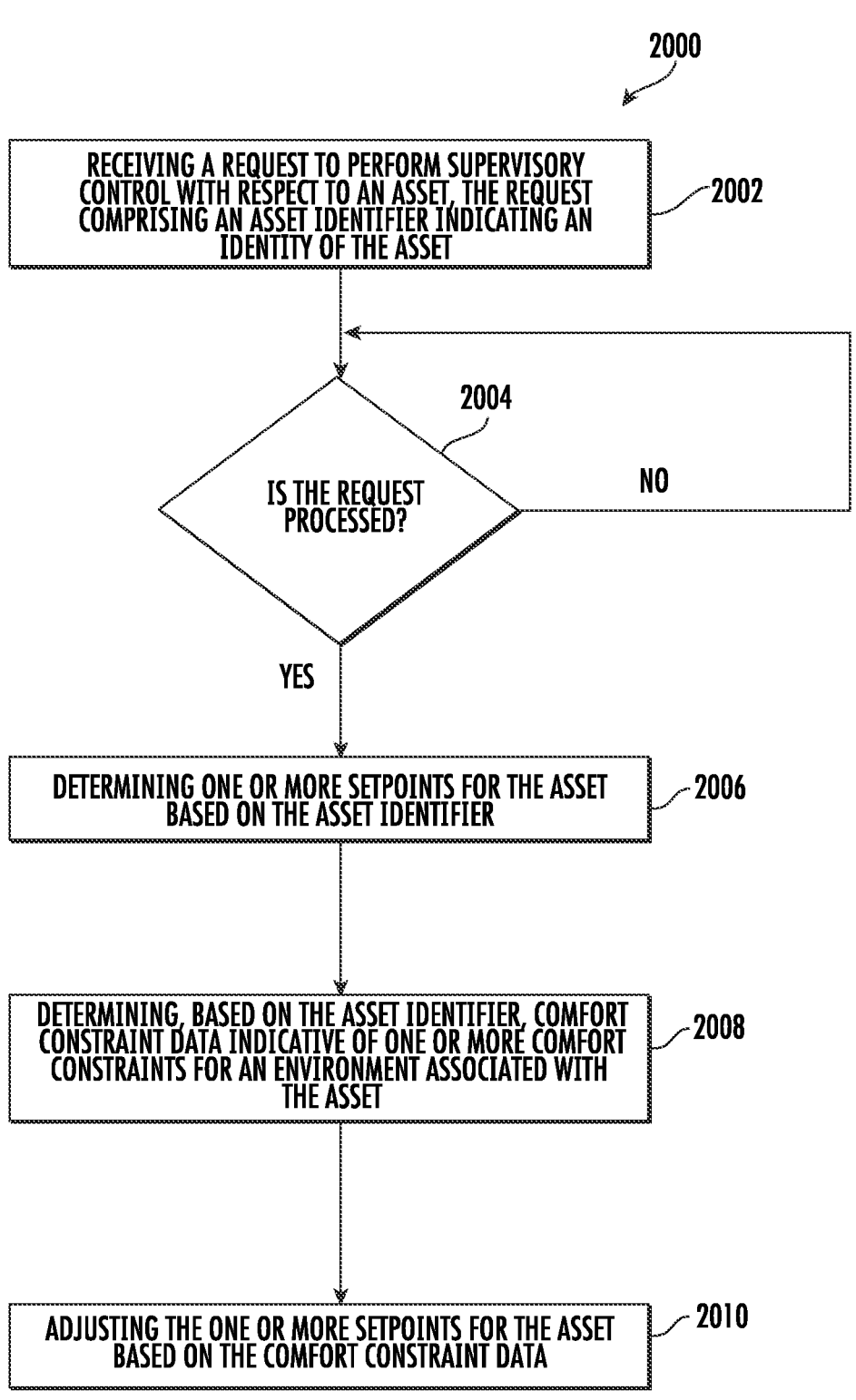
FIG. 20 illustrates a flow diagram for providing automated setpoint generation for assets via cloud-based supervisory control, in accordance with one or more embodiments described herein.

FIG. 20 illustrates a method 2000 for providing automated setpoint generation for assets via cloud-based supervisory control, in accordance with one or more embodiments described herein. The method 2000 is associated with the asset performance management computer system 302, for example. For instance, in one or more embodiments, the method 2000 is executed at a device (e.g., the asset performance management computer system 302) with one or more processors and a memory. In one or more embodiments, the method 2000 facilitates automatic adjustment of setpoints for an asset based on asset strategy associated with energy demand constraints for the asset and comfort constraints for an environment associated with the asset. In one or more embodiments, the method 2000 begins at block 2002 that receives (e.g., by the modeling component 306) a request to perform supervisory control with respect to an asset, the request comprising an asset identifier indicating an identity of the asset. The request to obtain the one or more asset insights provides one or more technical improvements such as, but not limited to, facilitating interaction with a computing device, extended functionality for a computing device and/or improving accuracy of data provided to a computing device.

At block 2004, it is determined whether the request is processed. If no, block 2004 is repeated to determine whether the request is processed. If yes, the method 2000 proceeds to block 2006. In response to the request, block 2006 determines (e.g., by the modeling component 306) one or more setpoints for the asset based on the asset identifier. The determining the one or more setpoints provides one or more technical improvements such as, but not limited to, improved energy efficiency, decreased energy consumption, extended functionality for a computing device and/or improving accuracy of data provided to a computing device. In certain embodiments, the determining the one or more setpoints comprises determining the one or more setpoints from asset strategy data associated with an operation strategy for the asset.

In response to the request, the method 2000 also includes a block 2008 that determines, based on the asset identifier (e.g., by the modeling component 306), comfort constraint data indicative of one or more comfort constraints for an environment associated with the asset. The determining the comfort constraint data provides one or more technical improvements such as, but not limited to, improved energy efficiency, decreased energy consumption, extended functionality for a computing device and/or improving accuracy of data provided to a computing device.

In response to the request, the method 2000 also includes a block 2010 that adjusts (e.g., by the supervisory control component 308) the one or more setpoints for the asset based on the comfort constraint data. The adjusting the one or more setpoints provides one or more technical improvements such as, but not limited to, improved energy efficiency, decreased energy consumption, providing a varied experience for a computing device.

In certain embodiments, the method 2000 additionally or alternatively includes providing the comfort constraint data to a comfort constraint model to facilitate the adjusting of the one or more setpoints.

In certain embodiments, the comfort constraint data comprises occupancy data for the environment, and the adjusting comprises adjusting the one or more setpoints by a defined amount in response to a determination that occupancy data satisfies a defined criterion.

In certain embodiments, the comfort constraint data comprises temperature data for another environment proximate to the environment, and the adjusting comprises adjusting the one or more setpoints by a defined amount in response to a determination that temperature data for another environment proximate to the environment satisfies a defined criterion.

In certain embodiments, the comfort constraint data comprises occupancy state data indicative of an occupancy state for the environment, and the adjusting comprises repeatedly adjusting the one or more setpoints by a defined amount and for a defined period of time in response to a determination that the occupancy state is altered.

In certain embodiments, the comfort constraint data comprises temperature data indicative of a temperature for the environment, and the adjusting comprises repeatedly adjusting the one or more setpoints by a defined amount and for a defined period of time in response to a determination that the temperature data is altered.

In certain embodiments, the adjusting comprises switching a first asset strategy for the asset to a second asset strategy in response to a determination that predicted uncertainty related to the comfort constraint data satisfies a defined threshold level.

In certain embodiments, the method 2000 additionally or alternatively comprises estimating one or more baseline values (e.g., one or more baseline setpoint values) based on a regression analysis process associated with the asset. In certain embodiments, the method 2000 additionally or alternatively comprises generating asset strategy data based on the one or more baseline values.

In certain embodiments, the method 2000 additionally or alternatively comprises estimating one or more baseline values based on a Gaussian process regression associated with the asset. In certain embodiments, the method 2000 additionally or alternatively comprises generating asset strategy data based on the one or more baseline values.

In certain embodiments, the method 2000 additionally or alternatively comprises determining training data generated by the asset in the environment over a certain interval of time. In certain embodiments, the method 2000 additionally or alternatively comprises generating asset strategy data based on the training data. In certain embodiments, method 2000 additionally or alternatively comprises determining historical training data associated with another asset. In certain embodiments, the method 2000 additionally or alternatively comprises generating asset strategy data for the asset based on the historical training data. In certain embodiments, the method 2000 additionally or alternatively comprises performing a setpoint optimization process for the asset strategy data in response to a determination that the asset is associated a transition between an on state and an off state.

In certain embodiments, the method 2000 additionally or alternatively comprises rendering a user interface to configure one or more portions of the asset strategy data. In certain embodiments, in response to the adjusting the one or more setpoints for the asset, the method 2000 additionally or alternatively comprises rendering a user interface to display one or more adjusted setpoint values for the one or more setpoints.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

FIG. 21 illustrates a method 2100 for providing automatic improvement of baselines for asset strategies, in accordance with one or more embodiments described herein. The method 2100 is associated with the asset performance management computer system 302, for example. For instance, in one or more embodiments, the method 2100 is executed at a device (e.g., the asset performance management computer system 302) with one or more processors and a memory. In one or more embodiments, the method 2100 begins at block 2102 that estimates (e.g., by the asset strategy component 304) one or more baselines for asset strategy data related to an asset based on a regression analysis process associated with the asset. The estimating the one or more baselines provides one or more technical improvements such as, but not limited to, extended functionality for a computing device and/or improving accuracy of data provided to a computing device.

The method 2100 also includes a block 2104 that determines (e.g., by the asset strategy component 304) a maximum uncertainty level for the one or more baselines. The determining the maximum uncertainty level provides one or more technical improvements such as, but not limited to, extended functionality for a computing device and/or improving accuracy of data provided to a computing device. In certain embodiments, the determining the maximum uncertainty level for the one or more baselines comprising determining the maximum uncertainty level at respective training points associated with the Gaussian process regression.

The method 2100 also includes a block 2106 that estimates (e.g., by the asset strategy component 304) one or more conditions related to energy optimization for an environment associated with the asset for a future period of time. The estimating the one or more conditions provides one or more technical improvements such as, but not limited to, extended functionality for a computing device and/or improving accuracy of data provided to a computing device. In certain embodiments, the future period of time is a next day, a next week, a next month, or another future period of time. In certain embodiments, the estimating the one or more baselines comprising estimating the one or more baselines based on a predetermined asset strategy for the asset. In certain embodiments, the estimating the one or more baselines comprising estimating the one or more baselines based on historical data associated with the asset. In certain embodiments, the estimating the one or more baselines comprising estimating the one or more baselines based on a Gaussian process regression associated with the asset.

The method 2100 also includes a block 2108 that determines (e.g., by the asset strategy component 304) a predicted uncertainty level for the one or more conditions related to the energy optimization. The determining the predicted uncertainty level provides one or more technical improvements such as, but not limited to, extended functionality for a computing device and/or improving accuracy of data provided to a computing device.

The method 2100 also includes a block 2110 that selects (e.g., by the asset strategy component 304) a predetermined asset strategy or an energy optimization asset strategy for the future period of time based on a comparison between the maximum uncertainty level and the predicted uncertainty level. The selecting the predetermined asset strategy or the energy optimization asset strategy provides one or more technical improvements such as, but not limited to, extended functionality for a computing device and/or improving accuracy of data provided to a computing device. In one or more embodiments, the selecting the predetermined asset strategy or the energy optimization asset strategy comprises applying the predetermined asset strategy or the energy optimization asset strategy for the asset during the future period of time. In one or more embodiments, the predetermined asset strategy is an original asset strategy for the asset.

In certain embodiments, the method 2100 additionally or alternatively includes re-estimating the one or more baselines for the asset strategy data based on the regression analysis process in response to selecting the predetermined asset strategy for the asset. In certain embodiments, the method 2100 additionally or alternatively includes re-estimating the one or more baselines for the asset strategy data based on a Gaussian process regression associated with the asset in response to selecting the predetermined asset strategy for the asset.

In certain embodiments, the method 2100 additionally or alternatively includes applying the predetermined asset strategy for the asset in response to a determination that the predicted uncertainty level is greater than the maximum uncertainty level. In certain embodiments, the method 2100 additionally or alternatively includes re-estimating the one or more baselines for the asset strategy data in response to applying the predetermined asset strategy for the asset.

In certain embodiments, the method 2100 additionally or alternatively includes updating the maximum uncertainty level in response to applying the predetermined asset strategy for the asset. In certain embodiments, the method 2100 additionally or alternatively includes applying the energy optimization asset strategy for the asset in response to a determination that the predicted uncertainty level is less than the maximum uncertainty level.

Figure 22:
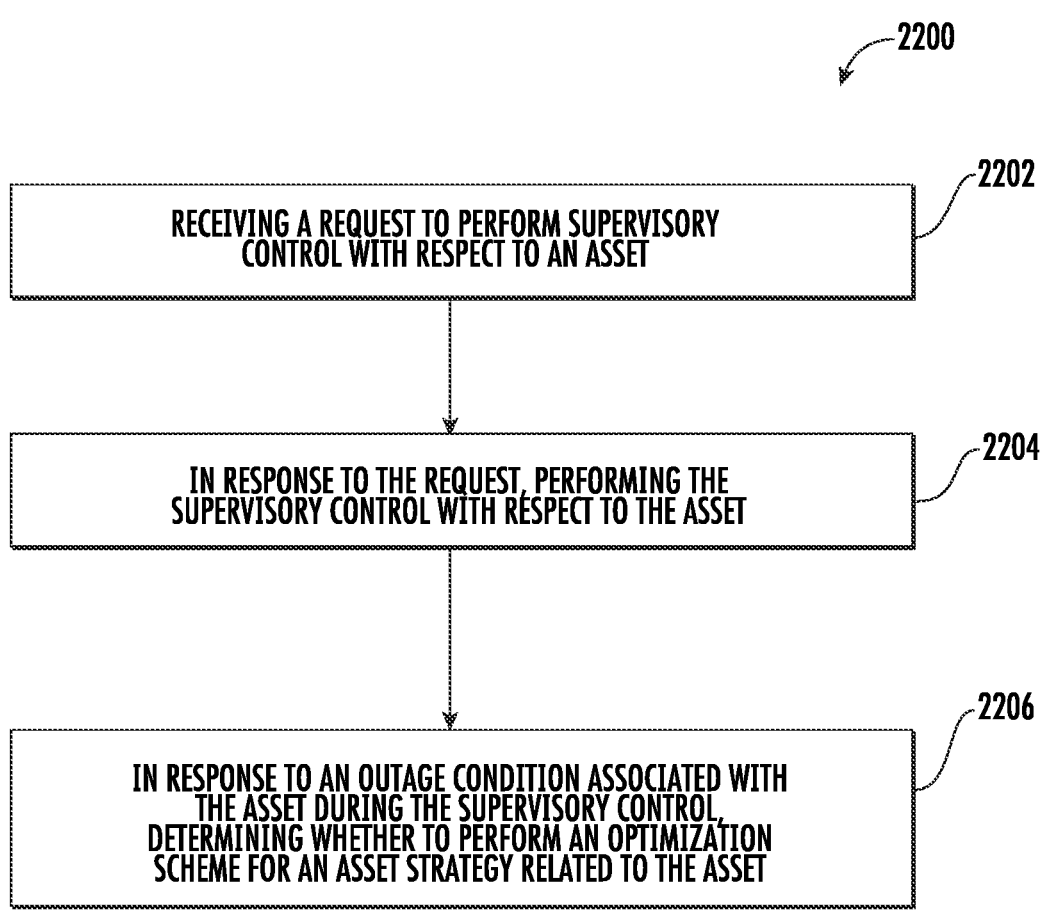
FIG. 22 illustrates a flow diagram for providing auto-mated recovery for cloud-based supervisory control, in accordance with one or more embodiments described herein.

FIG. 22 illustrates a method 2200 for providing automated recovery for cloud-based supervisory control, in accordance with one or more embodiments described herein. The method 2200 is associated with the asset performance management computer system 302, for example. For instance, in one or more embodiments, the method 2200 is executed at a device (e.g., the asset performance management computer system 302) with one or more processors and a memory. In one or more embodiments, the method 2200 begins at block 2202 that receives (e.g., by the modeling component 306) a request to perform supervisory control with respect to an asset. The request to perform the supervisory control provides one or more technical improvements such as, but not limited to, improved energy efficiency, decreased energy consumption, facilitating interaction with a computing device, extended functionality for a computing device and/or improving accuracy of data provided to a computing device.

The method 2200 also includes a block 2204 that, in response to the request, performs (e.g., by the supervisory control component 308) the supervisory control with respect to the asset. The performing the supervisory control provides one or more technical improvements such as, but not limited to, improved energy efficiency, decreased energy consumption, extended functionality for a computing device and/or improving performance of the asset.

The method 2200 also includes a block 2206 that, in response to an outage condition associated with the asset during the supervisory control, determines (e.g., by the supervisory control component 308) whether to perform an optimization scheme for an asset strategy related to the asset. The determining whether to perform the optimization scheme provides one or more technical improvements such as, but not limited to, improved energy efficiency, decreased energy consumption, extended functionality for a computing device and/or improving performance of the asset. In certain embodiments, the method 2200 additionally or alternatively includes, in response to determining to perform the optimization scheme, determining values for one or more setpoints related to the asset prior to the outage condition. In certain embodiments, the method 2200 additionally or alternatively includes, in response to a determination that a switch failure for the asset has occurred, erasing the values for the one or more setpoints for the asset. In certain embodiments, the method 2200 additionally or alternatively includes, in response to a determination that a switch failure for the asset has not occurred, setting the values for the one or more setpoints for the asset. In certain embodiments, the method 2200 additionally or alternatively includes, in response to determining to not perform the optimization scheme, determining values for control reliability signals for the asset. In certain embodiments, the method 2200 additionally or alternatively includes performing strategy planning for the asset based on the control reliability signals for the asset.

Figure 23:
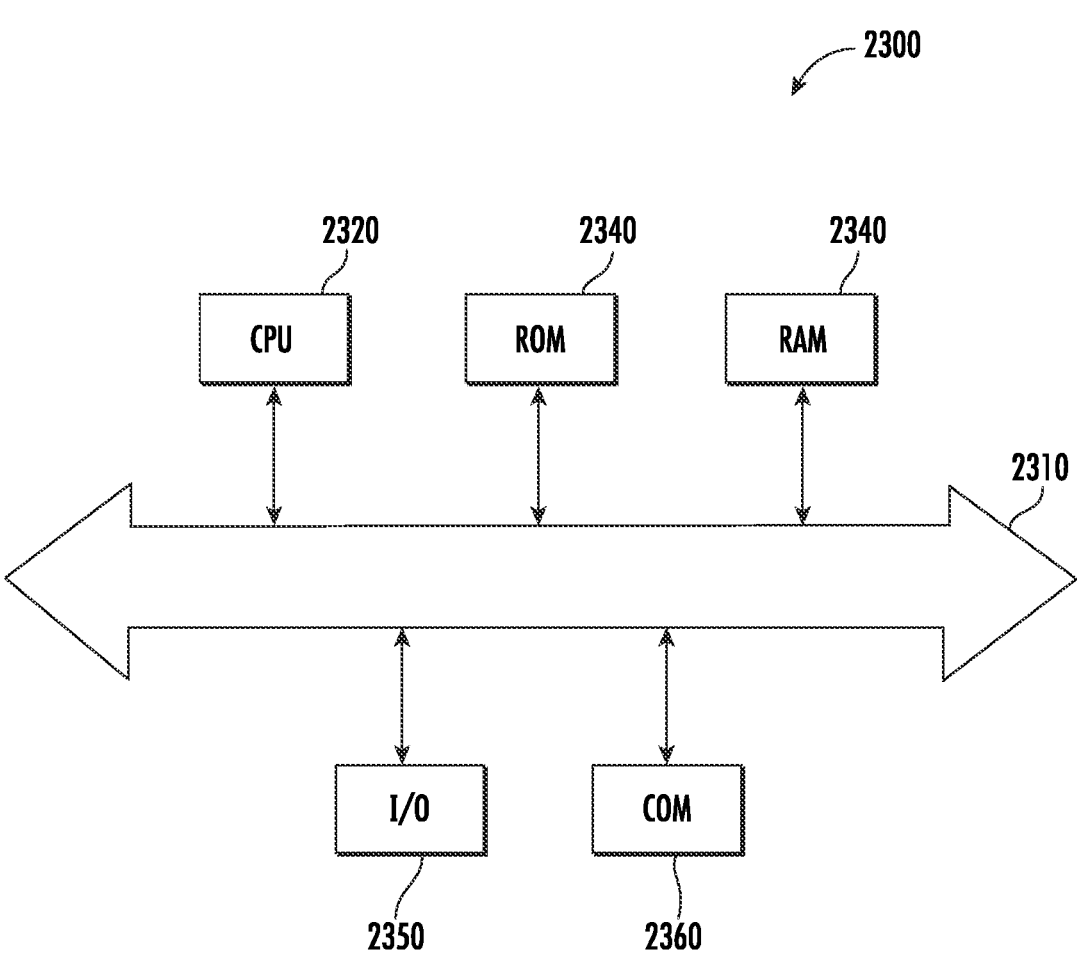
FIG. 23 illustrates a functional block diagram of a computer that may be configured to execute techniques described in accordance with one or more embodiments described herein.

FIG. 23 depicts an example system 2300 that may execute techniques presented herein. FIG. 23 is a simplified functional block diagram of a computer that may be configured to execute techniques described herein, according to exemplary embodiments of the present disclosure. Specifically, the computer (or "platform" as it may not be a single physical computer infrastructure) may include a data communication interface 2360 for packet data communication. The platform also may include a central processing unit ("CPU") 2320, in the form of one or more processors, for executing program instructions. The platform may include an internal communication bus 2310, and the platform also may include a program storage and/or a data storage for various data files to be processed and/or communicated by the platform such as ROM 2330 and RAM 2340, although the system 2300 may receive programming and data via network communications. The system 2300 also may include input and output ports 2350 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
estimate one or more baselines for asset strategy data related to an asset based on a regression analysis process associated with historical operational performance data of the asset;
determine a maximum uncertainty level for the one or more baselines;
estimate, for a future period of time, one or more conditions related to energy optimization for an environment associated with the asset;
determine a predicted uncertainty level for the one or more conditions related to the energy optimization;
compare the maximum uncertainty level for the one or more baselines and the predicted uncertainty level for the one or more conditions, wherein the maximum uncertainty level and the predicted uncertainty level are both determined using the regression analysis process;
based on a comparison between the maximum uncertainty level and the predicted uncertainty level, select a predetermined asset strategy or an energy optimization asset strategy for the future period of time;
execute the selected asset strategy by transmitting control signals to a control device associated with the asset to perform one or more operational changes, wherein the asset comprises at least a Heating, Ventilation, and Air Conditioning (HVAC) system, and wherein the control signals to the control device associated with the asset adjust at least one control parameter comprising a temperature setpoint, a supply air flow rate, a damper position, and a fan speed; and
update the selected asset strategy based on operational data received from the asset, wherein the operational data comprises real-time sensor measurements of attributes of a current performance state of the asset, and wherein the update comprises modifying the selected asset strategy by dynamically adjusting at least one control parameter and transmitting updated control signals to the asset, based on a comparison between a predicted value of an operational attribute and a real-time sensor measurement of the operational attribute, using a feedback loop that applies corrective adjustments to the control signals until a deviation between the predicted value and the real-time sensor measurement falls below a threshold.

2. The system of claim 1, the one or more programs further comprising instructions configured to:
estimate the one or more baselines based on a Gaussian process regression associated with the asset.

3. The system of claim 2, the one or more programs further comprising instructions configured to:
determine the maximum uncertainty level at respective training points associated with the Gaussian process regression.

4. The system of claim 1, the one or more programs further comprising instructions configured to:

in response to selecting the predetermined asset strategy for the asset, re-estimate the one or more baselines for the asset strategy data based on the regression analysis process.

5. The system of claim 1, the one or more programs further comprising instructions configured to:
in response to selecting the predetermined asset strategy for the asset, re-estimate the one or more baselines for the asset strategy data based on a Gaussian process regression associated with the asset.

6. The system of claim 1, the one or more programs further comprising instructions configured to:
apply the predetermined asset strategy for the asset in response to a determination that the predicted uncertainty level is greater than the maximum uncertainty level.

7. The system of claim 1, the one or more programs further comprising instructions configured to:
re-estimate the one or more baselines for the asset strategy data in response to applying the predetermined asset strategy for the asset.

8. The system of claim 1, the one or more programs further comprising instructions configured to:
update the maximum uncertainty level in response to applying the predetermined asset strategy for the asset.

9. The system of claim 1, the one or more programs further comprising instructions configured to:
apply the energy optimization asset strategy for the asset in response to a determination that the predicted uncertainty level is less than the maximum uncertainty level.

10. A method, comprising:
at a device with one or more processors and a memory:
estimating one or more baselines for asset strategy data related to an asset based on a regression analysis process associated with historical operational performance data of the asset;
determining a maximum uncertainty level for the one or more baselines;
estimating, for a future period of time, one or more conditions related to energy optimization for an environment associated with the asset;
determining a predicted uncertainty level for the one or more conditions related to the energy optimization;
comparing the maximum uncertainty level for the one or more baselines and the predicted uncertainty level for the one or more conditions, wherein the maximum uncertainty level and the predicted uncertainty level are both determined using the regression analysis process;
based on a comparison between the maximum uncertainty level and the predicted uncertainty level, selecting a predetermined asset strategy or an energy optimization asset strategy for the future period of time;
executing the selected asset strategy by transmitting control signals to a control device associated with the asset to perform one or more operational changes, wherein the asset comprises at least a Heating, Ventilation, and Air Conditioning (HVAC) system, and wherein the control signals to the control device associated with the asset adjust at least one control parameter comprising a temperature setpoint, a supply air flow rate, a damper position, and a fan speed; and
updating the selected asset strategy based on operational data received from the asset, wherein the operational data comprises real-time sensor measurements of attributes of a current performance state of the asset, and wherein the update comprises modifying the selected asset strategy by dynamically adjusting at least one control parameter and transmitting updated control signals to the asset, based on a comparison between a predicted value of an operational attribute and a real-time sensor measurement of the operational attribute, using a feedback loop that applies corrective adjustments to the control signals until a deviation between the predicted value and the real-time sensor measurement falls below a threshold.

11. The method of claim 10, the estimating the one or more baselines comprising estimating the one or more baselines based on a Gaussian process regression associated with the asset.

12. The method of claim 11, the determining the maximum uncertainty level for the one or more baselines comprising determining the maximum uncertainty level at respective training points associated with the Gaussian process regression.

13. The method of claim 10, further comprising:

in response to selecting the predetermined asset strategy for the asset, re-estimating the one or more baselines for the asset strategy data based on the regression analysis process.

14. The method of claim 10, further comprising:

in response to selecting the predetermined asset strategy for the asset, re-estimating the one or more baselines for the asset strategy data based on a Gaussian process regression associated with the asset.

15. The method of claim 10, further comprising:

applying the predetermined asset strategy for the asset in response to a determination that the predicted uncertainty level is greater than the maximum uncertainty level.

* * * * *